US011665224B2

(12) United States Patent
Gold

(10) Patent No.: US 11,665,224 B2
(45) Date of Patent: *May 30, 2023

(54) REMOTE CONTROL AUTHORITY AND AUTHENTICATION

(71) Applicant: N99 LLC, Amherst, MA (US)

(72) Inventor: Steven K. Gold, Amherst, MA (US)

(73) Assignee: N99 LLC, Amherst, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,401

(22) Filed: Jan. 5, 2022

(65) Prior Publication Data

US 2022/0131929 A1   Apr. 28, 2022

Related U.S. Application Data

(63) Continuation of application No. 17/007,107, filed on Aug. 31, 2020, now Pat. No. 11,265,364, which is a
(Continued)

(51) Int. Cl.
*H04L 67/025* (2022.01)
*H04L 67/125* (2022.01)
(Continued)

(52) U.S. Cl.
CPC .......... *H04L 67/025* (2013.01); *G06F 3/0481* (2013.01); *H04L 63/00* (2013.01);
(Continued)

(58) Field of Classification Search
CPC ..... H04L 67/025; H04L 63/00; H04L 67/125; H04W 4/80; H04M 1/72412; H04M 1/72415; H04M 2250/04; G06F 3/0481
See application file for complete search history.

(56) References Cited

U.S. PATENT DOCUMENTS 7,325,057 B2   1/2008   Cho
7,564,369 B1 *  7/2009   Adams ............ H04N 21/41407
                                                340/5.82
(Continued)

OTHER PUBLICATIONS

"BrandTable Concept Shows NFC at the Food Court," Sarah Perez, TechCrunch.com, Oct. 21, 2011, available online at http://techcrunch.com/2011/10/21/brandtable-concept-shows-nfc-at-the-food-court/.
(Continued)

*Primary Examiner* — Kashif Siddiqui
(74) *Attorney, Agent, or Firm* — Blueshift IP, LLC; Robert Plotkin

(57) ABSTRACT

The invention relates to systems and methods to enable a mobile device to be used as a remote control, in order to control one or more remotely controllable objects. In possible embodiments of the invention, proximity-based (or other) remote controls include control authorization to enable the transfer or sharing of control between different remote controls being implemented on different mobile devices, in order to permit different users to transfer or share control of a same remotely controllable object, for example. In other possible embodiments of the invention, a proximity-based (or other) remote control uses control authentication to enable the pairing of a remote control implemented on a device and a remotely controllable object, for example. Various embodiments of control authority and control authentication are possible and anticipated by the invention to address a wide range of practical remote control applications and provide many benefits to users.

46 Claims, 16 Drawing Sheets

Related U.S. Application Data continuation of application No. 16/436,713, filed on Jun. 10, 2019, now Pat. No. 10,778,747, which is a continuation of application No. 15/948,529, filed on Apr. 9, 2018, now Pat. No. 10,326,823, which is a continuation-in-part of application No. 15/710,366, filed on Sep. 20, 2017, now Pat. No. 9,942,304, which is a continuation of application No. 14/738,233, filed on Jun. 12, 2015, now Pat. No. 9,787,756, which is a continuation of application No. 14/504,852, filed on Oct. 2, 2014, now Pat. No. 9,060,011, which is a continuation of application No. 14/180,732, filed on Feb. 14, 2014, now Pat. No. 8,855,622, which is a continuation of application No. 13/346,601, filed on Jan. 9, 2012, now Pat. No. 8,655,345.

(60) Provisional application No. 62/422,377, filed on Nov. 15, 2016, provisional application No. 62/406,995, filed on Oct. 12, 2016, provisional application No. 62/399,058, filed on Sep. 23, 2016, provisional application No. 61/430,971, filed on Jan. 8, 2011.

(51) Int. Cl.
  *H04W 4/80* (2018.01)
  *G06F 3/0481* (2022.01)
  *H04L 9/40* (2022.01)
  *H04M 1/72412* (2021.01)
  *H04M 1/72415* (2021.01)

(52) U.S. Cl.
  CPC ...... *H04L 67/125* (2013.01); *H04M 1/72412* (2021.01); *H04M 1/72415* (2021.01); *H04W 4/80* (2018.02); *H04M 2250/04* (2013.01)

(56) References Cited

U.S. PATENT DOCUMENTS

| | | | |
|---|---|---|---|
| 8,412,839 B2 | 4/2013 | Harris | |
| 8,655,345 B2* | 2/2014 | Gold | H04M 1/72412 |
| | | | 345/173 |
| 8,855,622 B2* | 10/2014 | Gold | H04M 1/72415 |
| | | | 345/173 |
| 9,060,011 B2* | 6/2015 | Gold | H04L 67/025 |
| 9,787,756 B2* | 10/2017 | Gold | G06F 3/0481 |
| 9,942,304 B2* | 4/2018 | Gold | H04L 67/025 |
| 10,326,823 B2* | 6/2019 | Gold | H04L 12/2816 |
| 10,778,747 B2* | 9/2020 | Gold | H04L 63/00 |
| 11,265,364 B2* | 3/2022 | Gold | H04M 1/72412 |
| 2002/0077114 A1* | 6/2002 | Isham | H04L 67/04 |
| | | | 455/352 |
| 2003/0141987 A1* | 7/2003 | Hayes | H04B 1/205 |
| | | | 340/12.25 |
| 2008/0318564 A1* | 12/2008 | Kreiner | G08C 17/02 |
| | | | 455/420 |
| 2011/0016405 A1* | 1/2011 | Grob | H04N 5/23203 |
| | | | 715/740 |
| 2011/0105097 A1* | 5/2011 | Tadayon | H04L 43/16 |
| | | | 455/418 |
| 2012/0146918 A1* | 6/2012 | Kreiner | G06F 3/0481 |
| | | | 345/173 |
| 2012/0178431 A1 | 7/2012 | Gold | |
| 2012/0246717 A1* | 9/2012 | Burton | G06F 21/78 |
| | | | 726/21 |
| 2014/0162624 A1 | 6/2014 | Gold | |
| 2015/0017973 A1 | 1/2015 | Gold | |
| 2015/0281323 A1 | 10/2015 | Gold | |
| 2018/0013815 A1 | 1/2018 | Gold | |
| 2018/0227354 A1 | 8/2018 | Gold | |
| 2019/0297134 A1 | 9/2019 | Gold | |
| 2020/0404043 A1 | 12/2020 | Gold | |

OTHER PUBLICATIONS

DIRECTV Mobile Apps, available online at http://www.directv.com/DTVAPP/content/technology/mobile_apps, accessed on Jan. 9, 2012.

Insteon Web Site, available online at www.insteon.com, accessed on Jan. 8, 2012.

Issue Notification mailed Aug. 26, 2020 in U.S. Appl. No. 16/436,713 of Steven K. Gold, filed on Jun. 10, 2019, 1 page.

Non Final Rejection dated Mar. 20, 2020 for U.S. Appl. No. 16/436,713 of Steven K. Gold, filed Jun. 10, 2019, 16 pages.

Non-Final Office Action dated Nov. 30, 2018 for U.S. Appl. No. 15/948,529 of Steven K. Gold, filed Apr. 9, 2018, 11 pages.

Notice of Allowance dated Apr. 10, 2019, for U.S. Appl. No. 15/948,529 of Steven K. Gold, filed Apr. 9, 2018, 7 pages.

Notice of allowance dated Jul. 8, 2020 in U.S. Appl. No. 16/436,713 of Steven K. Gold, filed on Jun. 10, 2019, 7 pages.

Notice of Allowance dated Nov. 23, 2021 in U.S. Appl. No. 17/007,107, 9 pages.

"Brother Multi-Function Center: MFC-8480DN, MFC-8680CN, MFC-8890DW: Software User'S Guide: Version A: USA" Brother Industries, Ltd. user manual copyright dated 2009, 205 pages. Available online at < https://support.brother.com/g/s/id/htmldoc/mfc/cv_mfc8890dw/us/html/index.html>.

* cited by examiner

REMOTE CONTROL AUTHORITY AND AUTHENTICATION

BACKGROUND

Mobile devices—meaning portable electronic devices that are capable of wireless communication (e.g., cell phones, smart phones)—are widely used for a variety of digital and voice communication, and other purposes. Today's mobile devices enable, among other things, email, text messaging, instant messaging, Internet browsing and (still) phone conversation. In addition, mobile devices may be used to remotely control objects. For example, mobile devices may run applications that allow these devices to wirelessly control a home entertainment or lighting system. Such remote control may, for example, be by means of direct wireless control of an object (e.g., Bluetooth), meaning direct electromagnetic communication between the mobile device and the controlled object (such as is the case with today's television remote controls). This may occur by means of any of a variety of wireless protocols.

Some of the challenges faced by today's remote controls, including those implemented on mobile devices, relate to 1) the difficulties posed to a user to synchronize or otherwise set up a remote control so that it will communicate with a particular object that the user desires to control, 2) the need for a user to have multiple different remote controls for multiple different objects that a user desires to control, 3) difficulties updating remote control user interfaces, if even possible, and 4) a general lack of real-time feedback to the user relating to the object being remotely controlled.

There exists a need for improved methods, devices and systems that allow a user to use a mobile device, such as a common smart phone or similar electronic communication device, to readily "synchronize" the mobile device with one or more remotely controllable objects, and to enable the presentation and use of one or more relevant remote control user interfaces so that a user can efficiently and effectively remotely control one or more remotely controllable objects, possibly including real-time feedback.

SUMMARY

The present invention, in one embodiment, relates to a near-field communication (NFC) enabled mobile device that is able to communicate with one or more NFC element-associated remotely controllable objects, to cause the presentation of one or more object-relevant remote control user interfaces on a mobile device, the object-relevant remote control user interface which is then capable of receiving inputs from a user of the mobile device (the inputs relating to the user's desire to cause some action at the remotely controllable object, such as a remotely controllable television, for example), and to then wirelessly communicate information by means of a remote computer that electronically facilitates the desired action at the target remotely controllable object. The following definitions are general, not limiting, and detailed below: a "NFC enabled mobile device" is a mobile device (e.g., smart phone) equipped with a NFC reader (e.g., RFID tag reader) capable of wirelessly receiving a transmitted signal from a tag; this tag (or similar structure or object) is a "NFC element" which may be a passive or active transmitter that is associated (e.g., combined) with a remotely controllable object to provide a "NFC element-associated remotely controllable object"; a "user interface" is a presentation on a mobile device that invites and accepts user input; such a user interface is an "object-relevant remote control user interface" when it is directed to the remote control of a specific object or type of objects; and a "remote computer" is any electronic processing device physically separate from the mobile device.

The present invention includes many embodiments, such as variations in the ways that a remotely controllable object may be detected or identified, variations in possible remote control user interfaces and how they are communicated to a device and presented to a user of the device, variations in the protocols used by elements of the invention to communicate with one another, and more. In addition, embodiments of the present invention may enable feedback from the remotely controllable object to the mobile device, either by means of a remote control user interface, or otherwise, such as tactile feedback or audio signals. Many other variations of the invention are possible.

One example of an embodiment of a system of the present invention involves a mobile device, such as a smart phone (e.g., an Apple iPhone), having a mobile device-associated NFC element, the smart phone (when brought into physical proximity with an object-associated NFC element, e.g., within five centimeters, such that the mobile device-associated NFC element is capable of reading/receiving a signal from the object-associated NFC element) that identifies a remotely controllable object and then enables a specific remote control user interface for the remotely controllable object, the remote control user interface then being able to receive input from a user of the mobile device (e.g., an indication of a desired action at the remotely controllable object) using the remote control user interface presented on the smart phone, and the smart phone which then communicates (e.g., over the Internet or other network) information relating to the desired action to a remote computer (such as one that is in the "cloud" and remotely located from the object) to ultimately cause the desired action at the object. In this example, subsequent inputs may be input to the smart phone by the user to cause further responses at the remotely controllable object; the remote control user interface may be updated periodically, based on either user actions or sensed inputs at the remotely controllable object, the user may receive information by means of the smart phone relating to the status of the remotely controllable object, and more.

Another example representative of a method of the present invention includes the steps of: 1) a mobile device (being NFC equipped) being brought into physical proximity (e.g., within ten centimeters) with a NFC element that is associated with a remotely controllable object, 2) based on and in response to such approximation of the mobile device and the remotely controllable object, the mobile device then presenting a relevant remote control user interface that is capable of receiving input from a user relating to a desired action (by the user) at the object, 3) the mobile device remote control user interface receiving input from the user relating to a desired action, 4) the mobile device wirelessly communicating information relating to the desired action with a remote computer, 5) the remote computer communicating information relating to the desired action to an object controller associated with the object, and 6) the object controller facilitating the desired action at the object. Subsequent steps may relate to feedback of information sensed at the remotely controllable object, updates to the remote control user interface, and more. Additional steps, and variations on these steps, are also possible. For example, an authentication step (or multiple authentication steps) may occur at points in the process, such as only presenting a remote control user interface to certain users, or to certain (or all) users positioned within a defined geographic area (or space), or performing certain tasks (or exhibiting certain behaviors, such as may be sensed by sensors associated with a mobile device); or limiting inputs at the mobile device, or actions at the remotely controllable object, to certain users (or user groups) based on user identification, user authentication (by means such as a password, identity, behavior, or biometric scan), user behavior, or any of a variety of other information, inputs or metrics.

The preceding two embodiments are simply examples of embodiments of the present invention, and the invention can be embodied and implemented in any of a variety of ways. Examples of variations include different types of system elements (e.g., smart phone, dedicated remote control, portable control system) and related methods, different presentations of a remote control user interface, different communication means and protocols, different means of facilitating control of an object, and more. Systems and methods of the present invention may be implemented in any of a variety of ways. For example, systems and methods of the present invention may be implemented using a bar code and optical reader interaction, instead of near-field communication transmission and reception, respectively. It should be noted that the term "near-field communication" (also referred to as "NFC") is simply one possible means of having a mobile device interacting with an object to learn the identity of the object and/or which remote control user interface (or other element of the invention) to use. NFC, RFID, bar code, QR code and related "object identification" technologies are evolving rapidly along with how we refer to them, and each of these enables the passive non-contact identification of an object in a manner that is consistent with the present invention.

DETAILED DESCRIPTION

Figure 1A:
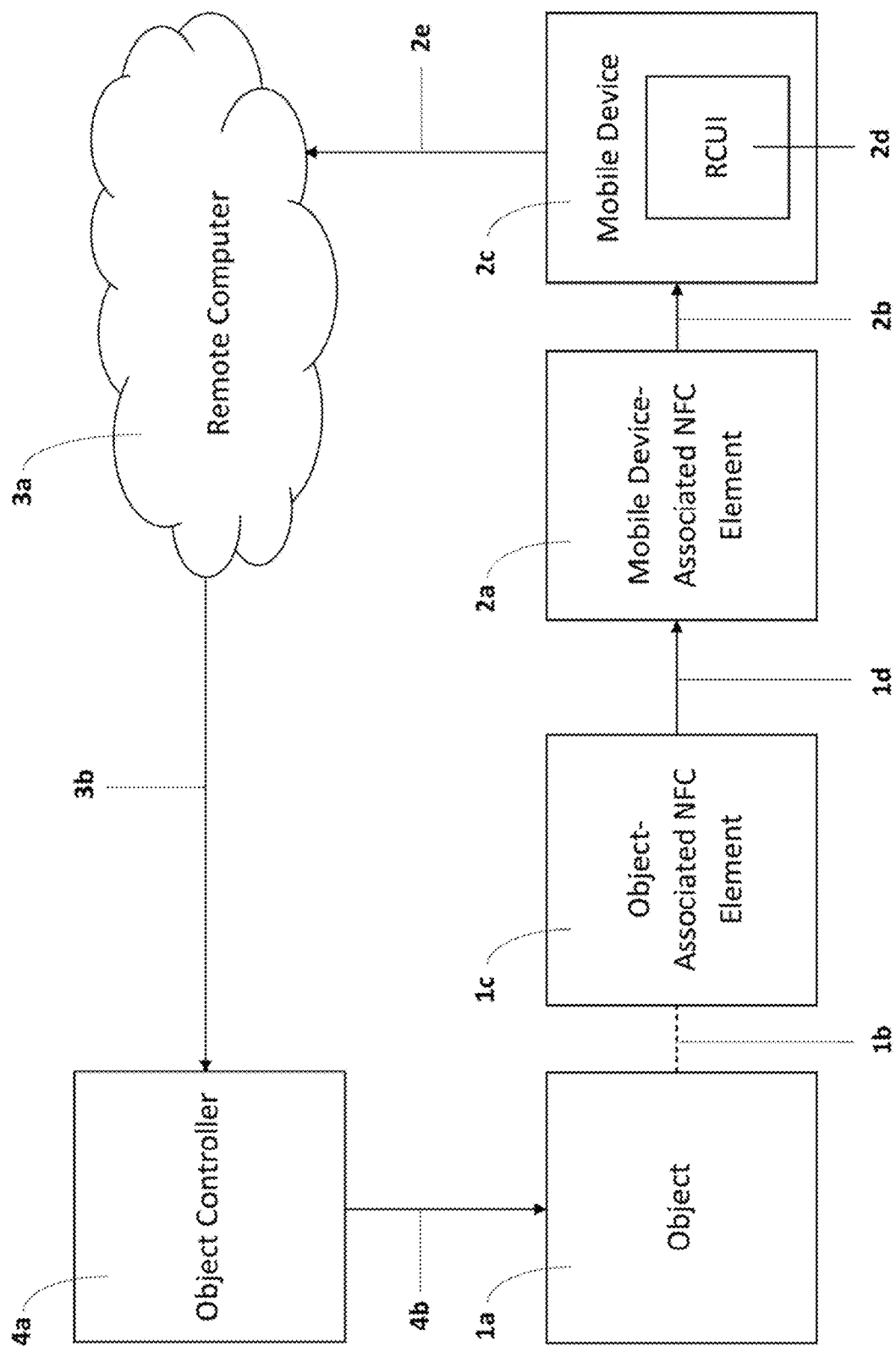
FIG. 1A shows a representation of an embodiment of a first system of the present invention.

The present invention relates to systems and methods for proximity-based remote controls (also, without limitation, referred to as proximity-based identification communication) that may be used, for example, to facilitate the identification of a remotely controllable object and enable a remote control user interface (RCUI) to be presented by a mobile device that then allows a user of the mobile device to remotely control the identified object by means of the remote control user interface. Such a RCUI may be presented by a mobile device on an electronic display as soft keys, for example, and such soft keys may be arranged or otherwise presented in a way that is relevant to (or even reconfigurable by) the system or a user, possibly based on user identification, authentication, preferences, user location, past behavior, or other information. The ability for a user to tag (e.g., approximate a mobile device too) an object to thereby remotely control the object may be implemented in any of a variety of ways. For example, embodiments of the present invention may enable upload of a RCUI (or the information needed to create a RCUI on a mobile device) to a mobile device, based on identification of an object desired to be controlled, from any of a variety of sources (e.g., a source associated with the object, a server that is in communication with the mobile device using a network such as the Internet). A RCUI may take any of a variety of forms, including but not limited to soft keys that are presented by an electronic display of a mobile device. Furthermore, embodiments of the present invention may use any of a variety of means to communicate remote control user interface inputs to an object controller. In one embodiments, such communication may take place wirelessly over a network, such as the Internet, and may include communication between a mobile device and a remote computer, and a remote computer and an object controller (that controls a controllable feature of the object), for example.

In one embodiment of the present invention, a proximity-based communication technology is near-field communication (NFC) technology, whereby a NFC reader-equipped mobile device communicates with a NFC element that is associated with a remotely controllable object. By "associated with," it is meant that a NFC element is either attached to, or located physically near, an object. For example, a NFC element may be built into the structure of a remotely controllable object, such as a toy. As another example, a NFC element may be located near a remotely controllable object, such as being placed on a wall of a room for which the lighting system is capable of being remotely controlled (in this example, it would be impractical to attach or access a NFC element onto a lighting element located in the ceiling). In such embodiments, this enables an object-relevant remote control user interface to be presented by the mobile device, in order to allow a user to control the remotely controllable object by means of the relevant remote control user interface enabled at the mobile device. Such an object relevant remote control user interface is also referred to herein as a "remote control user interface," "user interface," or "RCUI." An example of such a remote control user interface may be a presentation of soft keys (e.g., virtual buttons or other controls) on an electronic display on a mobile device. Such soft keys may be as simple as "on" and "off" buttons, or they may be much more complex control elements, such as visual representations of sliders, knobs switches and more. Another embodiment includes proximity-based identification technology that is an optical image reader (e.g., mobile device camera, bar code reader) that is capable of reading a bar code or other visual identification marking printed onto, or otherwise associated with, an object, to thereby enable a relevant remote control user interface in accordance with the invention. Other embodiments involving radio, visual, sound, movement and location (e.g., the enablement of remote control user interface based on a location of a mobile device) proximity-based communication means are also possible. In one embodiment of the present invention, a mobile device enables control of an object by means of wirelessly communicating information (e.g., over the Internet or other network) to a remote computer (e.g., a server or other computer located in the "cloud" and physically separate from an object), to cause the remote computer to further communicate information to an object controller that is capable of performing an action at or by the object.

For clarity, the term "proximity" means physically close, and more specifically that two structures (such as a mobile device and a NFC element) are either within a meter of each other, within ten centimeters of each other, within five centimeters of each other, within three centimeters of each other, within two centimeters of each other, within one centimeter of each other, or within any similar distance that enables accurate reading of a NFC or radio frequency identification (RFID) signal. For other identification means, such as the reading of a bar code or QR code, distances may be lesser or greater, such as within tens of meters, within one meter, within 10 centimeters, or possibly within much greater distances. In general, as NFC, RFID and other technologies evolve, the ability for transmitters to transmit signals over greater distances, and readers to receive signals over greater distances, will occur, and so "proximity" as it relates to the present invention may vary. In certain embodiments, proximity will be "in the line of sight" or a distance at which a user may readily access a particular remotely controllable object.

FIG. 1A shows a representation of a first embodiment of a system of the present invention. In this particular embodiment, an object 1a is associated with an object-associated NFC element 1c (the association represented as 1b), communication occurs between object-associated NFC element 1c and mobile device-associated NFC element 2a (the communication represented as 1d), mobile device-associated NFC element 2a communicates with mobile device 2c (the connection represented as 2b) in order to enable a remote control user interface ("RCUI") 2d, wireless communication occurs between mobile device 2c and a remote computer 3a (such wireless communication represented by 2e), the remote computer 3a then communicates with an object controller 4a (the communication represented as 3b) to ultimately control object 1a (such interaction represented as 4b). In another embodiment similar to the one represented in FIG. 1A, object-associated NFC element could instead be a bar code or other identifying mark or characteristic at or near the object, mobile device-associated NFC element could instead be an optical reader (such as a mobile device camera that serves as a bar code reader or scanner), and the communication between them could instead be a reading by the mobile device of the optical bar code or visual identifier. While such an optical implementation (versus the use of NFC) may be less convenient to use since a user of a mobile device would need to scan a bar code or other visual identifier, rather than quickly tag an object using NFC technology, the use of a printed bar code or other optically-readable identifier or characteristic at an object is less expensive to implement in many cases. For example, bar codes may be practical on printed documents, books, envelopes, packaging, garments, signs, etc. Other embodiments of systems of the present invention, including but not limited to object identification processes and means, are within the scope of the present invention.

Figure 1B:
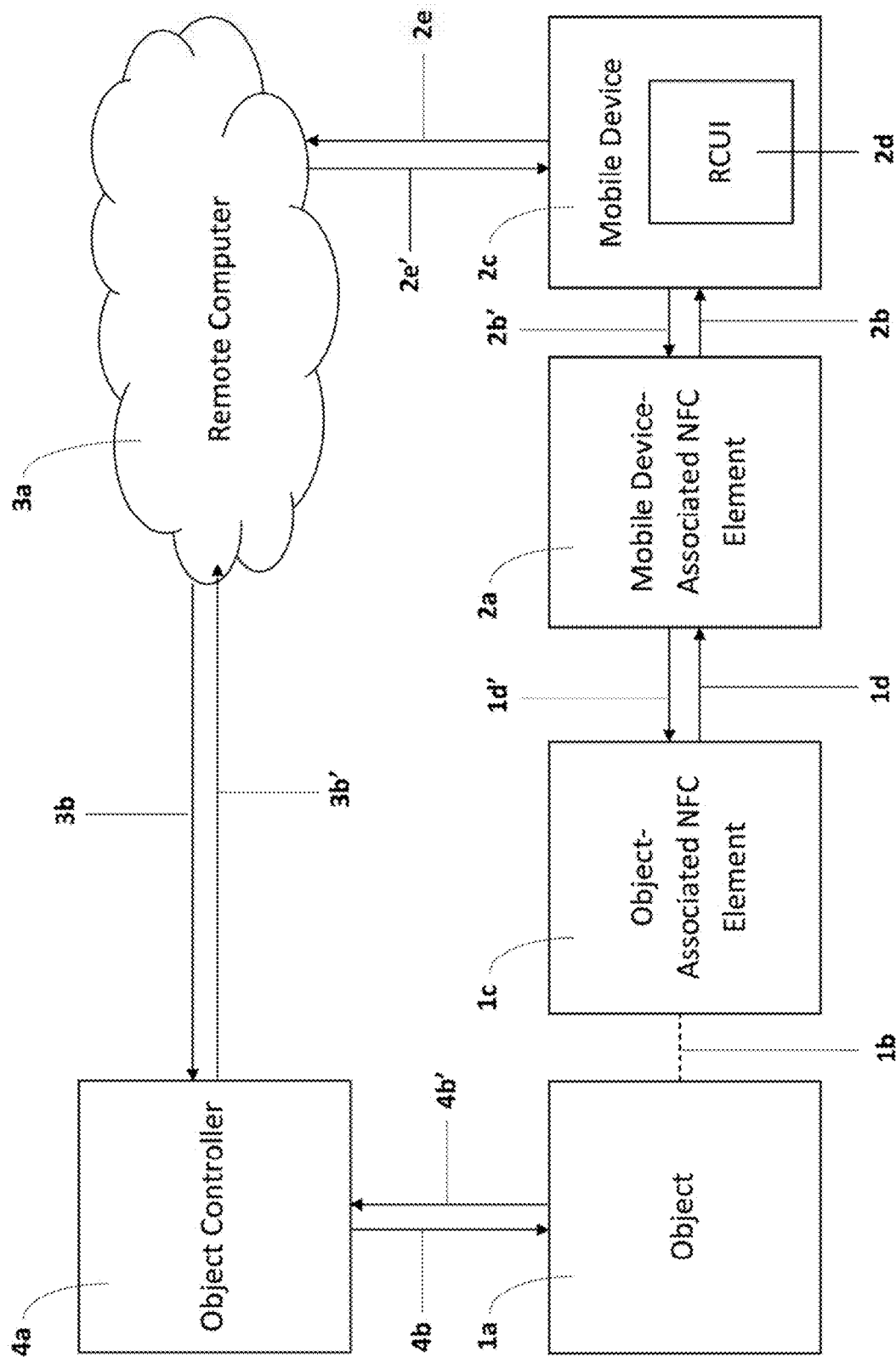
FIG. 1B shows a representation of a second embodiment of a system of the present invention.

FIG. 1B shows a second representation of an embodiment of a system of the present invention, having additional elements relative to the embodiment shown in FIG. 1A. Such additional elements are directed to providing "feedback" in a direction from generally the object to the mobile device (e.g., rather than providing control inputs at a mobile device to facilitate control of an object, these additional elements are, in one embodiment, intended to enable feedback from an object back to a mobile device, in order, for example, to provide a user with feedback and/or to facilitate control of the object). As shown in FIG. 1B, these additional elements may include: communication between mobile device-associated NFC element 2a and object-associated NFC element 1c (such communication represented as additional element 1d'), connection between mobile device 2c and mobile device-associated NFC element 2a (such connection represented as additional element 2b'), wireless communication between remote computer 3a and mobile device 2c (such communication represented as additional element 2e'), communication between remote computer 3a and object controller 4a (such communication represented as additional element 3b'), and interaction between object controller 4a and object 1a (such interaction represented as additional element 4b'). FIG. 1B shows these additional elements (relative to FIG. 1A), each of such additional elements which may be used in an embodiment of the present invention, or combined with other such additional elements (shown in FIG. 1A) to create other embodiments of the present invention. For example, one embodiment includes wireless communication 2e' and communication 3b', and not include communication 1d', connection 2b' and interaction 4d'. Also, for example, another embodiment of the present invention includes wireless communication 2e' and not communication 1d', connection 2b' communication 3b' and interaction 4b'. For purposes of this disclosure, the terms "communication," "connection," and "interaction" are used interchangeably and generally to mean a transfer of information between a first element and a second element in accordance with embodiments of the present invention. Other embodiments and variations of these embodiments of systems are within the scope of the present invention.

Object 1a may be any remotely controllable object, meaning that object 1a may be the subject of an action (or actions). Such action may be a form of control of object 1a, for example, such as turning it on or off, or altering its direction. Such action may also possibly be electronic in nature (and/or not readily apparent to a user of object 1a), such as changing a set-point stored in an object-associated data set, or configuring or reconfiguring software associated with the object. Embodiments of the present invention may include other types of "action." Representative objects 1*a* include, but are not limited to: electronic devices, mechanical devices, electromechanical devices, televisions, cable set-top boxes, media players, toys, entertainment systems, vehicles, aircraft, computers, mobile devices, office equipment, lighting, climate control systems, documents, security systems, doors or passages, manufacturing equipment, exercise equipment, medical devices, living organisms (e.g., by means of an electromechanical or medical device interface), and more. Representative actions that one or more objects may be subject to include, but are not limited to: being turned on, being turned off, being opened, being closed, getting directed or redirected (e.g., left, right, up, down), entering settings, changing settings, enabling access, denying access, having data transferred to object electronic memory, having a data element reset in object electronic memory, uploading or downloading software or executable code to the object (e.g., over the Internet or other network using the Internet Protocol (IP)) or other network, such as a Local Area Network (LAN), causing software or executable code to be run by an electronic processor that is associated with the object, changing channels, changing volume, causing an action to return to a default setting or mode, and more. Actions that are performed at an object include, for example, actions that are mechanical, electrical, electromechanical, and/or biological. Other variations in objects and ways to control such objects fall within the scope of the present invention.

Object-associated NFC element 1*c* is any means that enables "near-field" contactless communication with a mobile device-associated NFC element of the present invention. NFC technology aimed at use with mobile devices may generally perform one or more of the following functions, without limitation: 1) card emulation to cause a NFC element to behave like a contactless card; 2) reader mode wherein a NFC element may receive signals from a RFID tag or other passive or active transmitter; and 3) peer-to-peer (P2P) mode when a first NFC element associated with an object is able to communicate with a second NFC element associated with a mobile device, and more. A particular NFC technology (e.g., a NFC "chip" or RFID "tag") may transmit information, possibly receive information, or both (e.g., exchange information). Today's NFC technologies—meaning NFC technologies typically used at the time of this disclosure—are generally very short-range high-frequency (e.g., 13.56 MHz) wireless communication technologies that enable the communication of information or data between NFC-enabled devices over a distance of typically less than twenty centimeters, often less than ten centimeters, and often less than five centimeters. Such NFC technology may be currently (and in general) an extension of the ISO/IEC 14443 proximity card (RFID) standard that combines the interface of a smartcard and a reader into a single unit. A NFC-enabled device may be capable of communicating with existing ISO/IEC 14443 smartcards and readers, and also with other NFC-enabled devices. In general, this makes today's NFC technologies compatible with existing contactless communication infrastructure, such as contactless access and payment systems used in public transportation and retail environments, respectively. For purposes of this disclosure, "close physical proximity" may, as discussed earlier, mean distances of up to a meter, or up to ten centimeters, or up to five centimeters, or other distances; and possibly distances of more than a meter such as may be enabled by an active transmitter or more sensitive receiver. NFC element operating ranges depend on the type of NFC technology being used, specific models, and the way in which a particular NFC technology is implemented. For example, many passive RFID tags and readers require proximity of less than a few centimeters to operate under most operating conditions, whereas active (or semi-active) RFID tags may have a much greater functional range. Conditions that are external to a specific NFC technology or product may influence operating ranges and other functional characteristics. Antenna type and implementation, as well as the object or device with which a particular NFC technology is associated, may also affect the technology's performance characteristics. Today's NFC technology is being actively incorporated into a variety of mobile devices, such as smart phones, and it is expected that virtually all mobile communication devices will be NFC equipped (at least with readers capable of receiving signals being transmitted from a NFC element or RFID tag) in the future. In addition to NFC technology as it is known and recognized today, the present invention anticipates that NFC technology, along with related standards and communications protocols, will evolve. The use of the terms "near-field communication" and "NFC" (and "RFID") herein are meant only to represent such technologies in a general way. It is anticipated that future NFC technologies and implementations will enhance the value of embodiments of the present invention, and such future NFC technologies are anticipated in the present references relating to near-field communication, NFC and RFID. Variations in NFC elements and technologies of the present invention fall within the scope of the present invention.

Figure 1C:
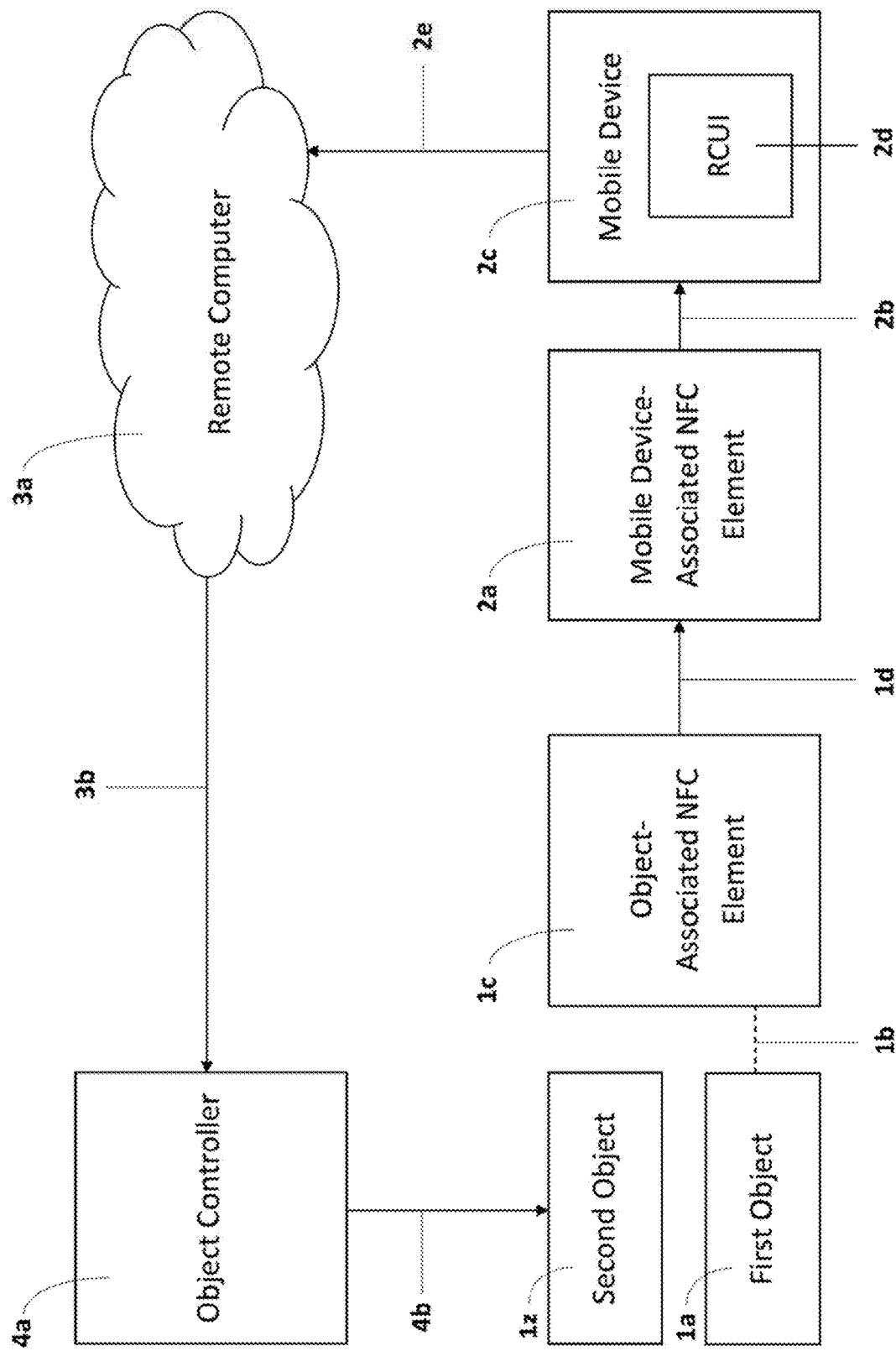
FIG. 1C shows a representation of a third embodiment of a system of the present invention.

Association 1*b* between object 1*a* and object-associated NFC element 1*c* may take any of a variety of forms. For example, in one embodiment of association 1*b*, object-associated NFC element 1*c* may be incorporated into or onto the physical structure of object 1*a* (e.g., embedded in a television, positioned on the surface of a set-top box). In another embodiment of association 1*b*, object-associated NFC element 1*c* may be physically separate from object 1*a*. In one such example, object-associated NFC element 1*c* may be located on or in a physical (e.g., paper) user manual relating to object 1*a*. In another example, object-associated NFC element 1*c* may be located on, at, or within a building or other structure, and may enable control of an object associated with the building or other structure, such as a lighting or entertainment system in a room of the building. In yet other examples consistent with the present invention, object-associated NFC element 1*c* may be located or positioned at a related object that is physically distant from the object to be controlled, but nevertheless associated with the object to be controlled. As an example, one such embodiment involves using a mobile device to tag a first object that is similar to a second object 1*z* (e.g., first and second objects are of the same type or category, first and second objects have one or more similar controllable elements), and being able to remotely control the second object 1*z* using the mobile device and user interface. FIG. 1C shows a representation of an embodiment relating to the concept of tagging a first object 1*a* and then being able to use a relevant RCUI to control a similar second object 1*z*. Various other associations 1*b* between object 1*a* and object-associated NFC element 1*c* are within the scope of the present invention. In general, however, a feature of any such association 1*b* is that a user may realize or be informed (e.g., by written notice or an image or logo that represents, for example, a network of objects or elements) that a particular object-associated NFC element 1c is associated with object 1a.

Mobile device-associated NFC element 2a may be a NFC element as described previously. Mobile device-associated NFC element 2a may be the same type as, or different from, object-associated NFC element 1c. For example, mobile device-associated NFC element 2a may be a fully-functional means that may serve to both wirelessly transmit and receive information, whereas object-associated NFC element 1c may simply be capable of transmitting a signal (e.g., a passive RFID tag). Mobile device-associated NFC element may be integrated with a mobile device, or may be connected or otherwise attached to a mobile device of the present invention using any of a variety of means. Mobile device-associated NFC element may be embodied in any of a variety of ways.

Mobile device-associated NFC element 2a and object-associated NFC element 1c are capable of communicating with one another, such as when they are brought into physical proximity with one another (this process may be referred to as "tagging" an object, and an object may be "tagged" by a NFC-equipped mobile device), either unidirectionally (meaning information is transmitted by an object-associated NFC element and received by a mobile device-associated NFC element) or bidirectionally (meaning both NFC elements have the ability to transmit information to, and receive information from, each other). In general, NFC communication between these elements occurs wirelessly (even when the structures associated with each NFC element touch one another). In one embodiment of the present invention, communication may be one-way transmission of information from object-associated NFC element 1c to mobile device-associated NFC element 2a, as represented by 1d in FIG. 1A (this may occur even when object-associated NFC element 1c is capable of two-way communication). In another embodiment of the present invention, communication may be two-way, meaning that both of the elements transmit and receive information from one another, as represented by 1d and 1d' in FIG. 1B. The preference or need for one-way or two-way communication between object-associated NFC element and mobile device-associated NFC element will depend on a variety of factors, including but not limited to the particular application(s) for an embodiment of a system of the present invention. In some embodiments, only identification of object 1a by mobile device 2c may be desired, in which case one-way flow of information from object-associated NFC element 1c to mobile device-associated NFC element 2a is required. References to "physical proximity" in this disclosure are intended to mean that NFC elements of the present invention are positioned close enough together that they are capable of communicating with one another. Variations in the communication between object-associated NFC element 1c and mobile device-associated NFC element 2a are within the scope of the present invention. In addition, the information communicated between an object-associated NFC element and a mobile device-associated NFC element may include, without limitation, information relating to the identity of the object. Furthermore, such information may relate to a remote control user interface, such as providing an upload of a particular RCUI to a mobile device (or alternatively providing information needed for the device to create a RCUI, e.g., based on accessing a library of remote control user interface elements that may be stored either by the device or by a remote computer, for example). Other types of information may also be communicated, possibly including information being sent from a mobile device to storage by electronic memory associated with the object-associated NFC element. In addition, any of a variety of communication protocols may be used to facilitate such communication between an object-associated NFC element and a mobile device-associated NFC element.

Mobile device 2c may be any of a variety of portable electronic devices (and that are equipped with, enabled, or associated with mobile device-associated NFC element 2a). In one embodiment, mobile device 2c is a smart phone (e.g., Apple iPhone, Android phone, Blackberry device). In other possible embodiments, mobile device 2c may be another device or technology fitting the functional description of a mobile device of the present invention (e.g., capable of presenting information to a user, receiving an input from a user, and being capable of communicating wirelessly with a remote computer). In one embodiment of the present invention, mobile device 2c includes a display capable of visually presenting information to a user. Other embodiments may include other means of presentation of information to a user, such as presenting information to the user via audio output (e.g., providing prerecorded and/or synthesized sounds, such as providing prerecorded and/or synthesized speech). Embodiments of mobile device 2c of the present invention may also provide tactile output, such as having the device vibrate. In addition, embodiments of mobile device 2c of the present invention include means for receiving an input (or multiple inputs, or simultaneous inputs) from a user of the device. Examples of means for receiving an input include, but are not limited to: soft keys, touch screen (e.g., interactive touch display), hard keys, switches, knobs, microphones, and user manipulation (e.g., tilting, turning, shaking) of the device. Variations in mobile devices, display means and input means of the present invention are within the scope of the present invention.

Figure 2C:
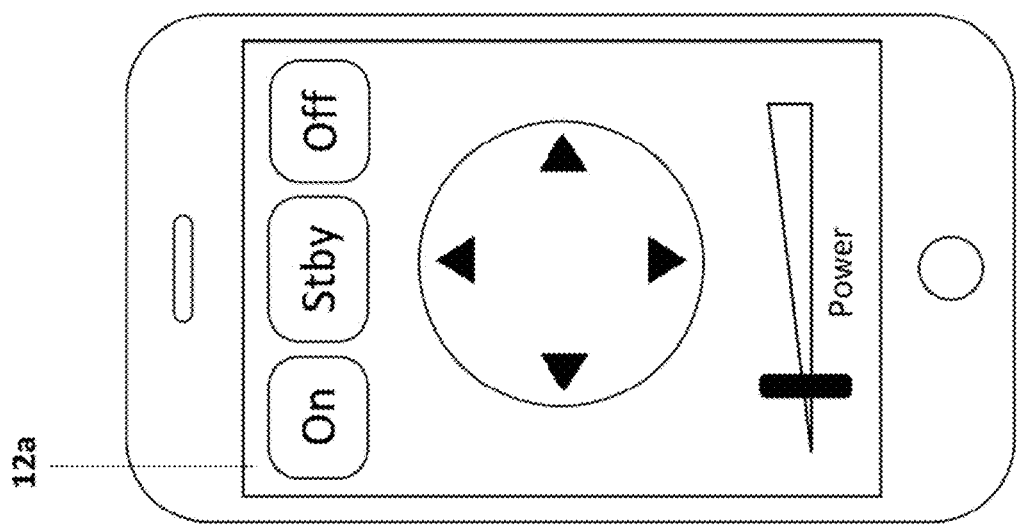
FIG. 2C shows a representation of a third embodiment of a remote control user interface.
Figure 2B:
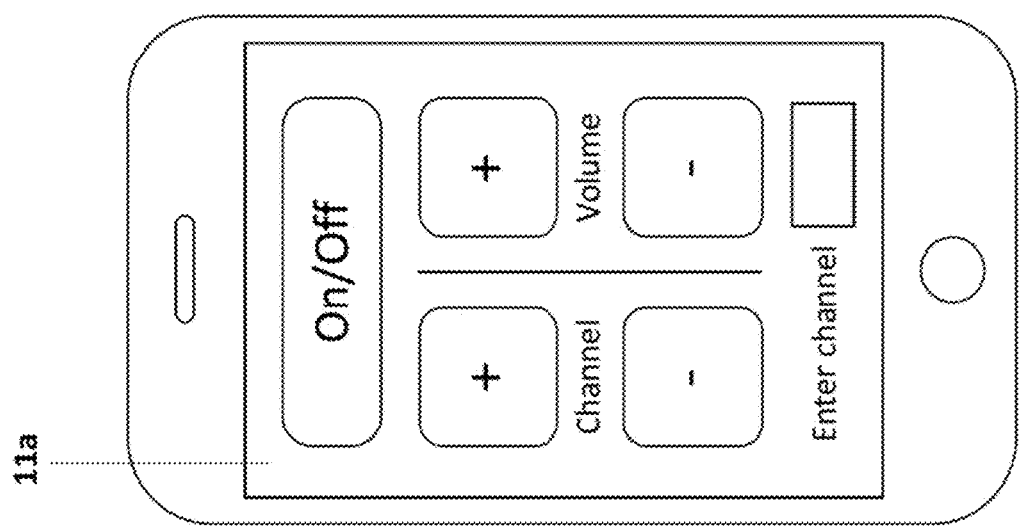
FIG. 2B shows a representation of a second embodiment of a remote control user interface.
Figure 2A:
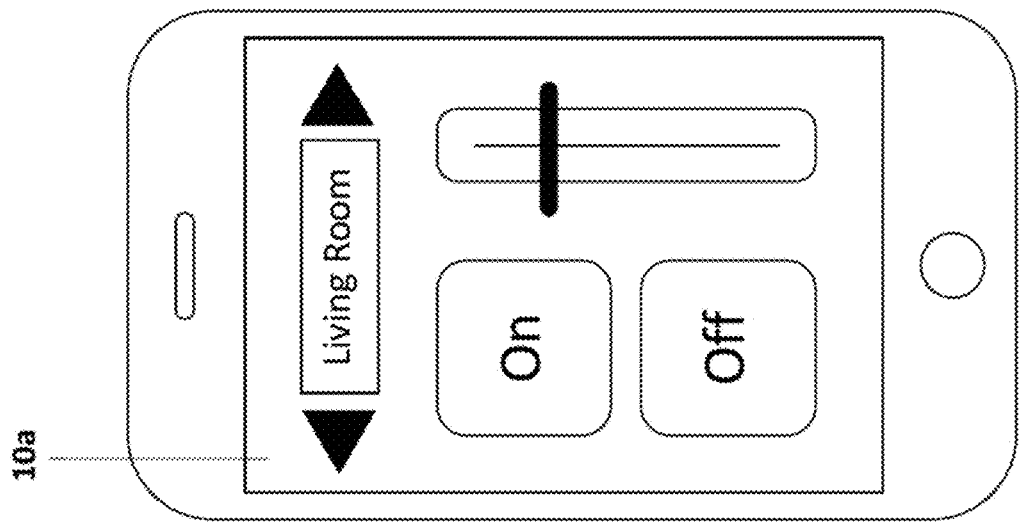
FIG. 2A shows a representation of a first embodiment of a remote control user interface.

Remote control user interface 2d is, in one embodiment, a presentation at mobile device 2c that communicates a remote control, such as one or more soft controls that may be interacted with by a user. Remote control user interface 2d enables interaction by a user to facilitate control of an object 1a. In one embodiment, remote control user interface 2d may automatically appear on a display of a mobile device, for example, and be readily available for use by a user. In another possible embodiment, remote control user interface 2d may be uploaded to a mobile device and stored for presentation and use at a future time. Control of an object 1a may be facilitated by remote control user interface 2d in any of a variety of ways, and using any of a wide range of embodiments. For example, remote control user interface 2d may be a visual presentation on an interactive (e.g., touch screen) display, such as the representative embodiments of remote control user interface shown in FIGS. 2A-2C, each of which shows a simplified representation of a mobile device 2c having a touch screen (e.g., display that can be used to both present information to a user of the device, and receive input from the user of the device, such as by means of touching the display surface with a finger) upon which representations of various embodiments of remote control user interface 2d are shown. In other embodiments, remote control user interface 2d may present information in other ways, and/or receive input from a user in other ways. For example, in one embodiment, remote control user interface 2d may be presented on another type of visual display, such as a non-interactive (e.g., non-touch screen) display. In another embodiment, remote control user interface may be presented as hard keys or controls, possibly involving an indication of which hard keys or controls may be used to control a particular target object. Embodiments may also involve non-visual presentations of a remote control user interface. In one such embodiment, sounds may be used to represent the possibility for a user to interact with such a remote control user interface to provide input or a command. In another embodiment, a synthetic voice may notify a user relating to control of a target object, or even guide a user through the input or selection of permissible commands to control a target object. Other means and modes of presenting a remote control user interface to a user are within the scope of the present invention. In addition, other means of interaction with a remote control user interface of the present invention may be used by embodiments of the present invention. In one embodiment, an interactive touch-screen display is used, such as shown in FIGS. 2A-2C. In another embodiment, hard keys located on a mobile device may be used to input information to a remote control user interface of the present invention. In other embodiments, sounds and/or voice commands may be used to provide input to a remote control user interface of the present invention. In yet another embodiment of a remote control user interface of the present invention, movement of the mobile device upon which the remote control user interface is operating may provide input to facilitate control of a target object (e.g., moving or rotating the mobile device to the left to cause a remotely controlled moving object to turn left; moving or tiling the mobile device to the right to cause the same remotely controlled moving object to turn right). Various combinations of one or more remote control user interface presentations and input means are within the scope of the present invention. In addition, embodiments that use other forms of input and output are within the scope of the present invention.

In one embodiment of the present invention, remote control user interface 2d is determined by virtue of object 1a identification, and then enabled on mobile device 2c. Remote control user interface may be selected from a group of predetermined remote control user interfaces, e.g., from a library of RCUIs stored in memory. Such a library of RCUIs may, for example, be stored in memory associated with mobile device 2c, or in memory associated with remote computer 3a (and made accessible to mobile device 2c, for example). Alternatively, embodiments of the present invention may provide for dynamic creation of a RCUI from a library of pre-defined remote control user interface elements. Such a library of RCUI elements may, for example, exist in memory associated with a mobile device 2c, remote computer 3a, or object-associated NFC element 1c. In the case when RCUI (or RCUI element) information or data is stored separately from mobile device 2c, such information or data (as needed to facilitate creation or presentation of a RCUI on mobile device 2c) is communicated from where the data is stored to mobile device 2c, using any of a variety of means, including those described herein. For example, a user may place a mobile device 2c near an object-associated NFC element 1c for object 1a to cause mobile device 2c (possibly in communication with remote computer 3a) to identify a relevant remote control user interface 2d for the particular object 1a. In the case where object 1a is a television, for example, the enabled remote control user interface 2d may resemble the representative remote control user interface 2d shown in FIG. 2B (including on/off, volume and channel selection controls). In one embodiment of the present invention, remote control user interface 2d is provided from a set of predesigned remote control user interfaces, subject to identification of an object and determination of which one of the set of predesigned remote control user interface is most relevant to a user relative to the remote control of the particular object. In another embodiment of the present invention, a remote control user interface may be dynamically created based on a set (e.g., a library) of predefined remote control user interface elements (e.g., volume control, channel control, direction control), and provided to a user, possibly based on the known preferences of the particular user (e.g., which remote control user interface elements should be included and/or positioned in a particular way, color scheme), or other information relating to a user, object or circumstances. In yet another embodiment of the present invention, a remote control user interface may be communicated by means of a transfer of executable code or otherwise (e.g., using identifiers that enable selection and configuration of remote control user interface elements) from an object-associated NFC element to a mobile device so that the particular remote control user interface may be enabled on the mobile device. In yet another embodiment of the present invention, the object-associated NFC element communicates information that enables a mobile device to further communicate with a remote computer in order to transfer information (possibly including instructions, software or executable code, or a combination of these) from the remote computer to the mobile device. In yet other embodiments of the present invention, the remote control user interface may be provided to the mobile device, or enabled at the mobile device (e.g., presentation to a user, or access enabled for a user) based on a device location, such as may be determined by a device-associated global positioning system (GPS) or Wi-Fi positioning system (WPS), or other device location determination means. These embodiments, and others, enable the provision and/or presentation of a remote control user interface that is most relevant (e.g., most useful, efficient, well-organized, pertinent) for the remote control of a particular object, type of object, or controllable element that may exist in multiple objects or types of objects. Notably, embodiments of the present invention may enable "on the fly" access to a relevant remote control for an object, for immediate or future use. In addition, remote control user interfaces of the present invention may be, in some embodiments of the present invention, reconfigurable—possibly either automatically (e.g., by means of a remote control user interface software update, by means of some development at the object), or manually by a user of a mobile device. Examples of reconfiguration may include addition or deletion of a control element (e.g., a button or slider), rearrangement of control elements, and more. Such reconfigurations may occur during an instance of use, or between instances of use. Variations of remote control user interfaces of the present invention, methods and means of their selection, methods and means of their presentation, methods and means of their use, and methods and means of their enablement on a mobile device of the present invention, are within the scope of the present invention.

In general, any wireless communication described herein—including but not limited to the upload of a RCUI from a source to a mobile device—may be implemented in any of a variety of ways, including, without limitation, by means of current near-field communications technologies and related standards and protocols (e.g., for near-range wireless communications used by certain embodiments of the present invention), as well as current mobile device (e.g., cell phone) communication technologies and related standards and protocols (e.g., for longer-range wireless communication used by certain other embodiments of the present invention). It is understood that wireless communication technologies, standards and protocols are evolving rapidly, and that systems and methods of the present invention may be implemented using any of a wide range of these technologies, standards and protocols.

Similarly, uploading, transferring, transmitting, or otherwise providing a remote control user interface (or any data or information related to such a user interface) described herein may be implemented, for example, by performing such transmission over any network, such as the Internet (or other network that uses the Internet Protocol (IP)), a Local Area Network (LAN), or other similar network. Furthermore, any reference herein to communication over "the Internet" should be understood to refer more generally to any communications performed using the Internet Protocol (IP) or any similar protocol.

As a specific example, the systems of FIGS. 1A-1D may include multiple remote control user interfaces. For example, such multiple remote control user interfaces may be stored at the remote computer 3a, the object 1a, the object-associated NFC element 1c, or elsewhere. At least two of the multiple RCUIs may differ from each other and be associated with different remotely-controllable objects. Within the multiple remote control user interfaces there may, for example, be at least: (1) a first remote control user interface associated with a first remotely-controllable object; and (2) a second remote control user interface associated with a second remotely-controllable object. The first remote control user interface may differ from the second remote control user interface, and the first remotely-controllable object may differ from the second remotely-controllable object. For example, the first remote control user interface may include a user interface element (such as a soft key representing a button) that the second remote control user interface does not include. As examples of ways in which the first remotely-controllable object may differ from the second remotely-controllable object, the first and second remotely-controllable objects may be different instances of the same product (e.g., a first and second television of the same make and model), or instances of different products (e.g., a television and a DVR). For example, in response to detecting that the mobile device is in physical proximity to the first object, the first user interface that is associated with the first object is selected, and presented by the mobile device to the user. Also, for example, in response to detecting that the mobile device is in physical proximity to the second object, the second user interface that is associated with the second object is selected, and presented by the mobile device to the user. A mobile device may store (and make accessible to a user) only the first remote control user interface, only the second remote control user interface, or both of them (e.g., a user may be able to select one of them, or switch between them in order to have ready access to two different RCUIs for control of two different objects). In addition, a mobile device or other element of an embodiment of a system of the present invention may store various RCUIs (such as those that have been previously accessed or used by a user on a particular mobile device) so that the user may readily access any of them on the mobile device in the future. Similarly, portions or elements of RCUIs may be stored in electronic memory by the mobile device or elsewhere for future access and use, such as for the creation of a future remote control user interface.

In one embodiment, based on input received by mobile device 2c remote control user interface 2d relating to an action that a user desires to be performed at object 1a, mobile device 2c communicates information relating to the desired action to remote computer 3a by wireless communications means. Such wireless communications means may, in one embodiment, be any communication means typically used by cellular phones that use radio waves to exchange information with one or more base stations (e.g., cell sites) of a network of base stations, the network which is further connected (e.g., by wires, or wirelessly) to remote computer 3a. Variations in communication between mobile device 2c (or possibly other elements of the present invention having wireless transmission means) and remote computer 3a of the present invention are within the scope of the present invention. In such an embodiment of the present invention, remote computer 3a is remote and physically separate from object 1a, meaning that remote computer 3a and object 1a may be located thousands of miles away from each other, for example. In other embodiments of the present invention, remote computer 3a and object 1a may be in close proximity. In general, however, mobile device and remote computer are physically distinct.

In one embodiment, remote computer 3a is a computer, server or other electronic information processing technology, possibly including or being associated with a database, that is i) capable of receiving information from mobile device 2c, ii) possibly manipulating, converting or interpreting the received information, and then iii) further communicating the same or new information to object controller 4a to ultimately facilitate some action to be performed at object 1a, for example. In another embodiment of the present invention, remote computer 3a is "in the cloud," meaning that remote computer 3a is an information processing system (e.g., computer) that is physically remote and distinct from object 1a, and may be distributed in nature. As a result, remote computer 3a may communicate with object 1a over the Internet or other network. Other embodiments of remote computer 3a are within the scope of the present invention.

Information may be communicated between remote computer 3a and object controller 4a using any one or more of a variety of means, including, but not limited to, wires, fiber optic cable, or wirelessly. In one embodiment, for example, remote computer 3a communicates with object controller 4a (the interaction represented in FIG. 1A as 3b) using the Internet (which may include wired and/or wireless modes of information transfer, for example), for example. Also, any of a variety of communications protocols may be used in such an information transfer or exchange 3b. Whether the communication between remote computer 3a and object controller 4a is one-way or two-way, the information being transferred from remote computer 3a to object controller 4a is sufficient to enable object controller to facilitate the control of object 1a in a manner desired by a user, according to the input received at the relevant remote control user interface 2d. Such communication between remote computer 3a and object controller 4a may take place by means of a network, such as the Internet. An embodiment may use multiple such communications means, possibly simultaneously. Variations in communication means between remote computer 3a and object controller 4a are within the scope of the present invention.

Object controller 4a receives information from remote computer 3a, such information relating to the desired action to be performed at or upon object 1a. Object controller 4a may, in one embodiment, be any means that translates the information received from remote computer 3a into the action to be implemented at object 1a, for example. In one embodiment, object controller 4a may be built into object 1a and may control some controllable aspect of object 1a, such as a movement or sound volume, for example. In yet another embodiment, object controller 4a may be external to object 1a, such as a robot or piece of manufacturing equipment that performs some action to control object 1*a*. In yet another embodiment, object controller 4*a* may be attachable or connectable to object 1*a*. Object controller 4*a* may, in one embodiment, include a combination of electronic means to receive and process information, and electromechanical means to cause the performance of a physical movement or action at object 1*a*, e.g., opening a door (the door which would, in this example, be object 1*a*), causing a toy to move forward (the toy which would, in this example, be object 1*a*), resetting a medical device (the medical device which would, in this example, be object 1*a*). In another embodiment, object controller 4*a* may be an electronic processor capable of controlling electronic signals that may facilitate performance of a desired action, e.g., changing volume of a television (the television which would, in this first example, be object 1*a*), changing a presentation on a display (the display which would, in this example, be object 1*a*). In yet another embodiment, object controller 4*a* may be an electronic processor that causes execution of code or software in another electronic processor or device. In various embodiments, object controller 4*a* may be or include, either alone or in combination, without limitation, any of the following: actuator, servo, motor, computer, signal processor, electronic storage device, responsive material, magnetic device, biomechanical means, light, display, heating element, or speaker. In yet other embodiments, object controller 4*a* may be or include means that are adjustable or changeable, and that perform any of a wide range of permissible actions at object 1*a*. Variations in the way object controller 4*a* controls an object 1*a* of the present invention are within the scope of the present invention.

FIG. 1B shows examples of other possible interactions between various elements an embodiment of the present invention similar to the embodiment shown in FIG. 1A, including interactions 1*d'*, 2*b'*, 2*e'*, 3*b'* and 4*b'*. Each of these interactions may, for example, relate to a communication protocol (e.g., a signal to initiate or facilitate a communication, acknowledge receipt of information, increase data integrity), or provision of feedback to the recipient element of the present invention. For example, interaction 4*b'* may provide information from object 1*a* to object controller 4*a* indicating that a specific desired action has been performed by object 1*a*. Alternatively, interaction 4*b'* may include the provision of information relating to object 1*a* that gets communicated back to remote control user interface 2*d* (by means of remote computer 3*a*) to provide information at remote control user interface 2*d* that would help a user of the remote control user interface 2*d* control object 1*a*. In general, an embodiment of an individual interaction 1*d'*, 2*b'*, 2*e'*, 3*b'*, 4*b'* may be a communication (e.g., exchange of data, bits, information) between relevant elements of the present invention that i) transfers information relating to a desired action to be performed at object 1*a*, ii) confirms instructions or actions relative to performance of a desired action at object 1*a* (e.g., feedback), or iii) provides information to remote control user interface 2*d* that helps a user understand, monitor or control object 1*a*. Other interactions and communications between elements of the present invention are within the scope of the present invention.

FIG. 1C shows a representation of an embodiment of a system of the present invention that represents tagging of a first object 1*a* (that is similar to a second object, of the same type as a second object 1*z*, or having one or more similar controllable features as second object 1*z*), which—by means of the systems and methods described herein—enables the remote control of second object 1*z*. For example, tagging a first image projector with a NFC-equipped mobile device would allow a user to use the mobile device 2*c* and remote control user interface 2*d* to communicate with a remote computer 3*a* and object controller 4*a* that controls a second image projector, in order to control the second image projector. In such a use case, where there are two or more similar objects (meaning, for example, objects that have the same controllable features and may be controlled by the same relevant remote control user interface), the remote control user interface that is enabled may, for example, offer a user the ability to select which specific object (possibly from a group of objects) the user desires to control. For example, tagging a first object that is a remotely controllable toy may enable a relevant remote control user interface that allows a user to select if the user wants to control the first object, or any one (or more) other similar remotely controllable toys. Such ability to select which object to control, from among multiple similar objects, may involve user authentication and/or authorization protocols (as described herein) so that any particular mobile device 2*c* or user is provided the ability to control only certain objects. Variations in the methods and means for tagging a first object to then be able to control a second object that is similar (or has similar control elements) to the first object, are within the scope of the present invention.

Figure 1D:
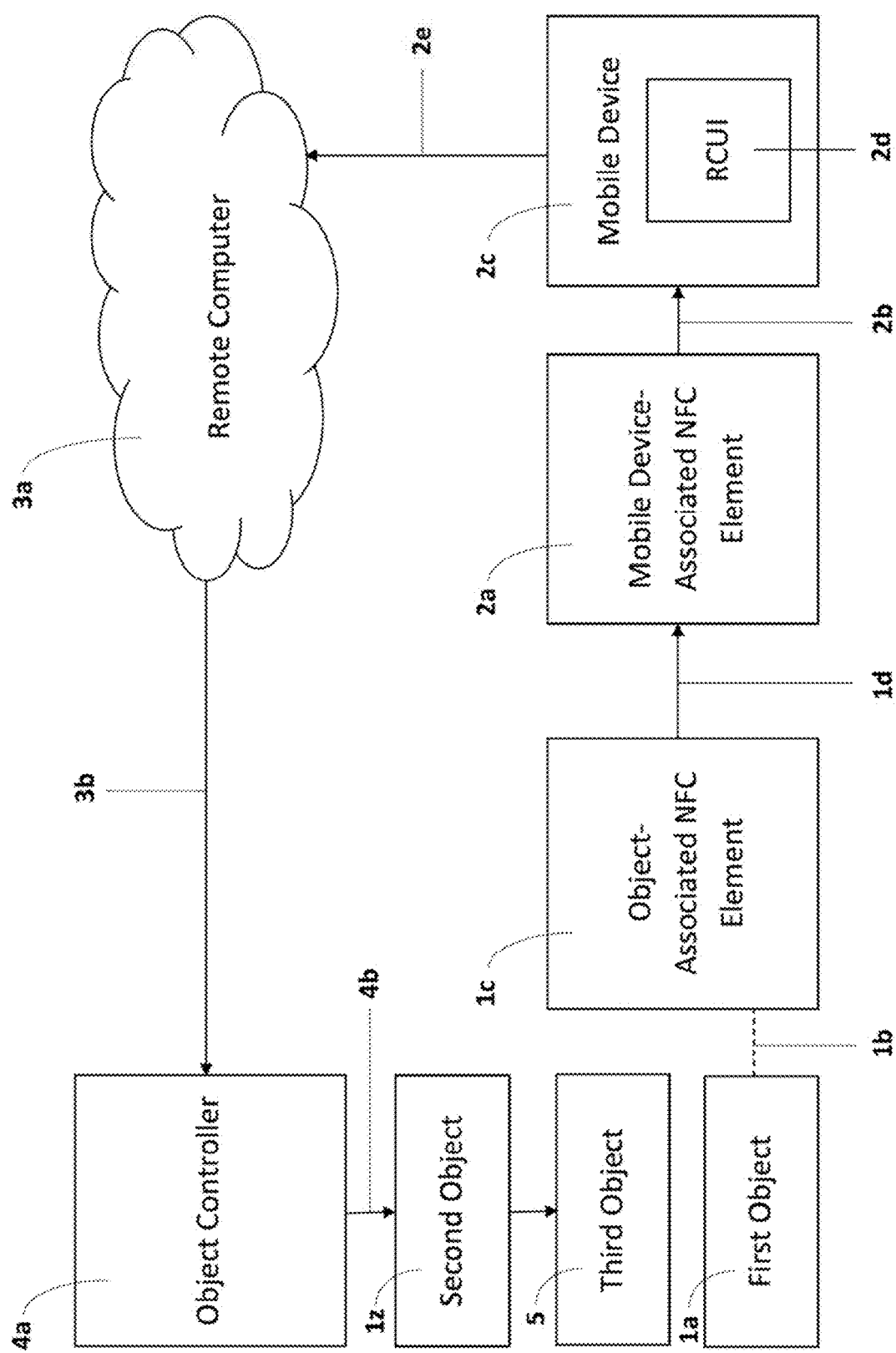
FIG. 1D shows a representation of a fourth embodiment of a system of the present invention.

FIG. 1D shows yet another embodiment of the present invention. In this embodiment, first object 1*a* is tagged, leading to enablement of a remote control user interface 2*d* that facilitates the control of manufacturing equipment (second object 1*z*, which is not similar to object 1*a*), which causes the manufacture of a third object 5 which is similar in at least some ways to object 1*a*. An example of this would be a user using a mobile device to tag an item of clothing that the user admires and wishes to order in a different color, size, etc. Upon tagging the item of clothing, the user would be presented with a remote control user interface that allows the user to select, for example, a garment size, color, fabrics, and possibly other customizable characteristics of the garment. The remote control user interface would then lead to the control (by providing the user's desired garment characteristics) to machinery capable of creating the garment, for example. Such machinery would then, in whole or in part, manufacture the garment according to the desired characteristics as input to the remote control user interface by the user. The result would be a third object 5 that is similar, in at least some ways, to tagged object 1*a*. When an object may be considered as part of a set of related objects, such an embodiment may be viewed as tagging one element of the set and then controlling another related element of the set.

FIGS. 2A-2C each show a representation of an embodiment of remote control user interfaces of the present invention. FIG. 2A shows an embodiment of a remote control user interface 10*a* shown on an interactive (e.g., touch screen) display of a mobile device 2*c* that could be used to enable control of a residential lighting system. As a further example, FIG. 2B shows an embodiment of a remote control user interface 11*a* shown on an interactive (e.g., touch screen) display of a mobile device 2*c* that could be used to control a television, including turning the television on and off, and also enabling channel and volume selection. As yet another example, FIG. 2C shows an embodiment of a remote control user interface 12*a* shown on an interactive (e.g., touch screen) display of a mobile device 2*c* that could be used to remotely control a remote control aircraft, enabling a user to cause the aircraft to go left or right, up or down, faster or slower. These representations show only a small range of features and presentations of remote control user interfaces that may be implemented according to the present invention. Notably, remote control user interfaces of the present invention may be presented in other ways (e.g., using sounds or voices), may be interacted with in other ways (e.g., mobile device movement, voice commands), may use any of a wide range of control elements and control element presentations (some of which may possibly be modified by a user), and may provide additional information or feedback to a user. Many variations in the remote control user interface of the present invention are within the scope of the present invention.

Figure 3A:
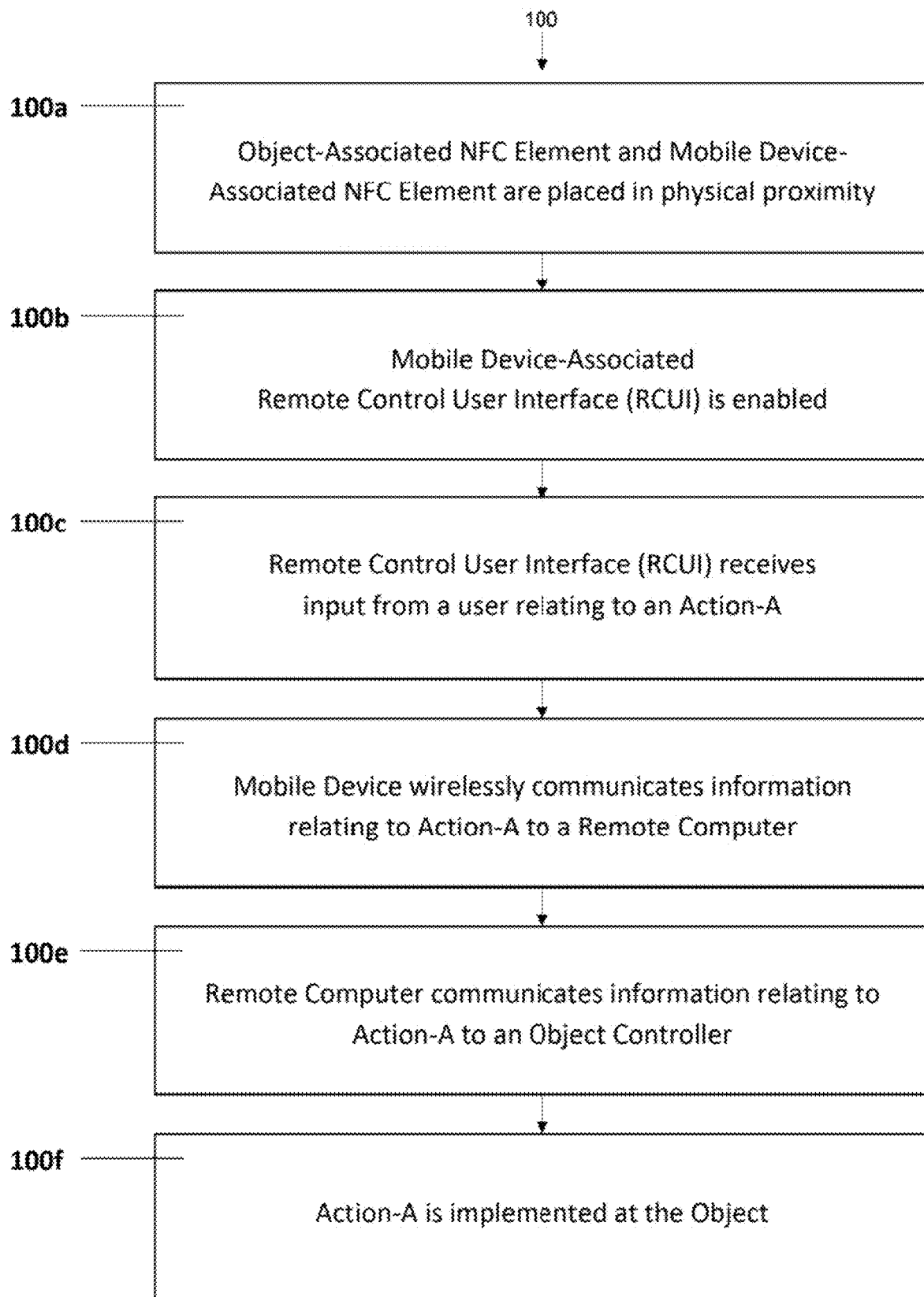
FIG. 3A shows a representation of a first embodiment of a method of the present invention.

FIG. 3A shows a representation of an embodiment of a method 100 of the present invention. In a first step 100a, object-associated NFC element and mobile device-associated NFC element are placed in physical proximity (e.g., a distance of less than twenty centimeters from one another). Next, as shown in step 100b, mobile device remote control user interface (RCUI) is enabled, meaning that a user interface is presented to a user. In step 100c, the remote control user interface receives an input from a user that relates to a desired action (Action-A). Next, in step 100d, the mobile device communicates information relating to Action-A to a remote computer. In step 100e, the remote computer further communicates information to an object controller. In step 100f, Action-A is implemented at the object. Variations of the method 100 shown in FIG. 3A are within the scope of the present invention, including the addition or deletion of steps in the process, additional communications between various elements of the present invention, possibly enabling visual or tactile feedback to be provided to the user by means of the remote control user interface or other means; updating of information presented on a remote control user interface, possibly including real-time updates relating to an object; and more.

Figure 3B:
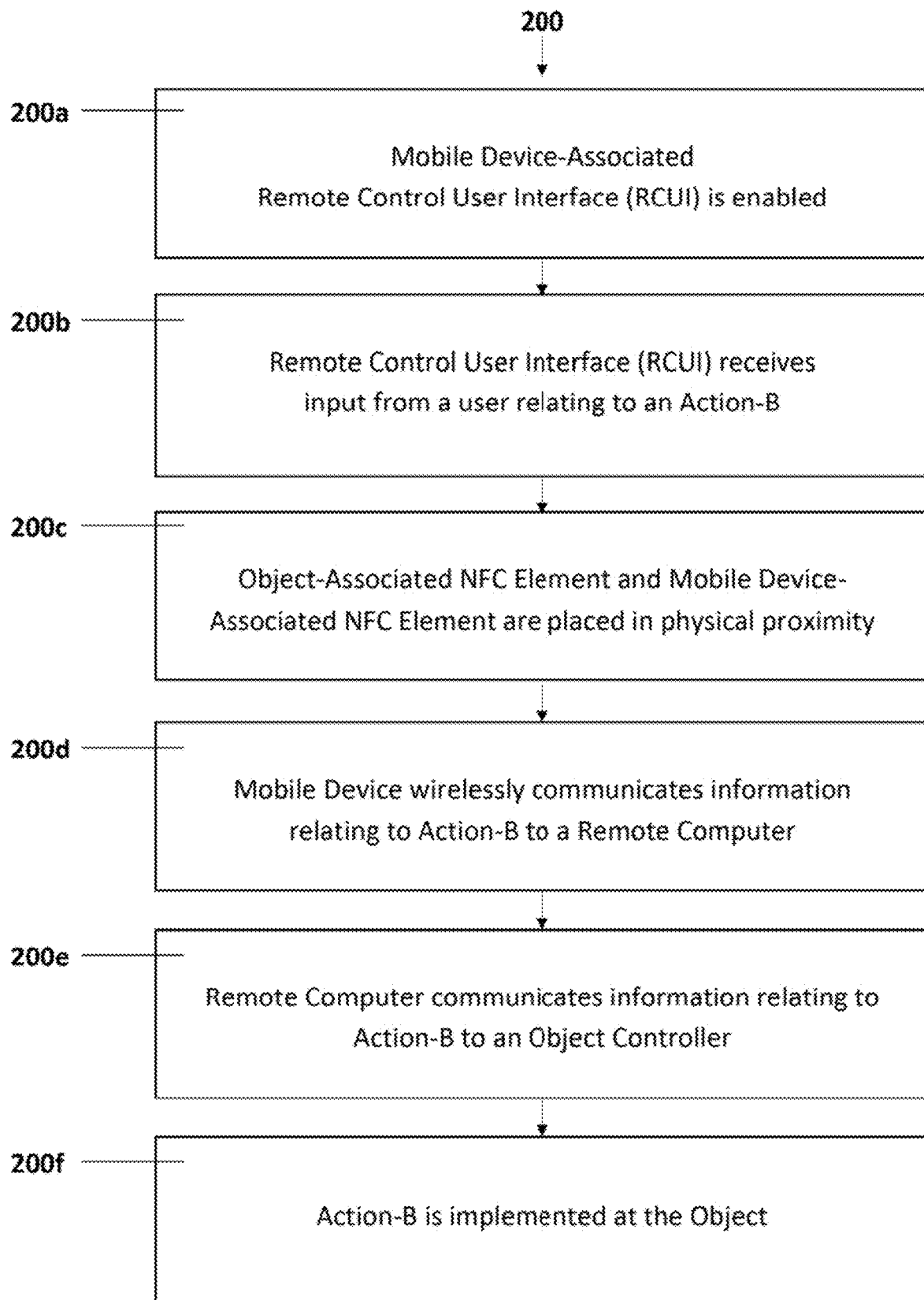
FIG. 3B shows a representation of a second embodiment of a method of the present invention.

Embodiments of the present invention may also present a remote control user interface to a user prior to the tagging (e.g., identification) of a specific object to be controlled. FIG. 3B shows a representation of such an embodiment of a method 200 of the present invention. Method 200 relates to providing remote control user interface prior to tagging an object that is desired to be remotely controlled, involving the steps of: first enabling remote control user interface at a mobile device 200a, then having the remote control user interface receive input from a user relating to an Action-B 200b, next placing mobile device-associated NFC element and object-associated NFC element in physical proximity (e.g., tagging the object with the mobile device) 200c, next mobile device wirelessly communicates information relating to Action-B to a remote computer 200d, the remote computer then communicates information relating to Action-B to an object controller 200e, and in a last step of method 200 the Action-B is implemented at the object 200f. Other preceding, intervening or following steps are within the scope of the present invention (e.g., feedback from the object to the RCUI, or other communications between elements of the system of such an embodiment of the present invention). For example, a first object may be tagged, and then a second object (that is similar to the first object, of the same type as the first object, or having at least one common controllable feature as the first object) may be remotely controlled. As may be seen by this example, embodiments of the present invention may include variations in how they are used, the sequence of steps or events during use, and how this provides for the control of objects.

Figure 3C:
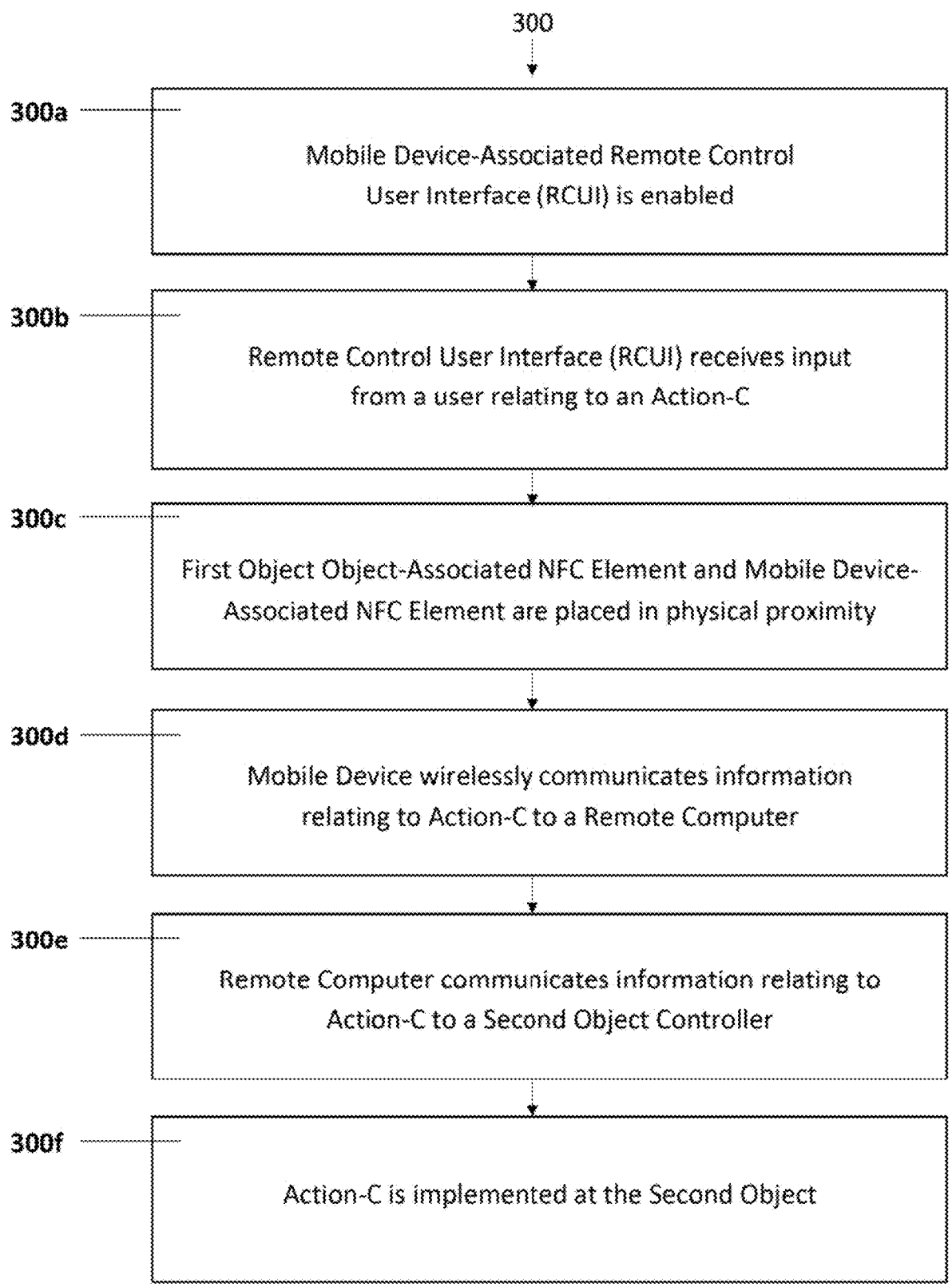
FIG. 3C shows a representation of a third embodiment of a method of the present invention.

FIG. 3C shows such a method 300, which may be essentially method 200 with some variation, such that a first object is tagged and a second object is controlled. For example, mobile device could show a RCUI and allow a user to provide one or more inputs using the RCUI, and then the mobile device could be used to tag an object in order to control that object in some way, including for example, providing user-specific settings to the object, by means of communication with a remote computer, as described. A similar (but not the same object that is to be controlled) may have been tagged initially, which may have facilitated the upload, download or other provisioning of a relevant RCUI to the mobile device. In one example of a use of such an embodiment of a method and systems of the present invention, a user would use a RCUI that allows the user to enter settings for a piece of exercise equipment, such as a treadmill. Settings could relate to the duration and/or difficulty of an exercise session, for example. Alternatively, a user might be able to simply select from one of a variety of exercise routines. These settings would be stored in memory and upon approximation of the NFC-equipped mobile device and a NFC-equipped object (which may be the same or a similar object to one previously tagged, such as the same treadmill as was initially tagged, or a treadmill right next to it or of a similar type at another location), the object would receive the user's selected settings and implement them. Another example relating to embodiments that may apply a method 300 of the present invention relates to tagging a building or associated structure, such as a first object at a front desk of a hotel, and then being able to control various second objects, possibly depending on the location of the mobile device (e.g., a lighting remote control would enable control of lights only in a guest room in which the mobile device is then located). Variations in methods 200 and 300 are within the scope of the present invention. Control of a second object (based on initially tagging a separate but related object) has many benefits, and may be further modified based on the location of a user, user identification or authentication, and more.

An embodiment of a method of the present invention may provide for user or device authentication as part of a process. For example, user or mobile device identity might be verified by any of a variety of means prior to enablement (e.g., presentation) of a remote control user interface, or prior to a user's ability to use a remote control user interface, or prior to the acceptance or carrying out of certain user commands by means of a particular remote control user interface. For example, controlling a piece of dangerous machinery might require authentication of the device user prior to enabling control; placing an order that would charge a credit card might seek authentication of the user (or possibly the device, or both) prior to enabling control of the order process; or control of any personal or privately-owned object might require authentication of a mobile device or user, meaning a device or user that has been predetermined to be allowed to control the object. Such authentication could be accomplished in any of a variety of ways, or combinations of ways, using any of a range of means, including but not limited to: username and/or password input, device identification, device location, time of day, timeframe (e.g., if input is received within a certain amount of time from an initial use or other event), biometric data input to a device, user behavior (e.g., speed, movement, past purchases), user metrics (e.g., sensed inputs, trends), and more. Authentication may be automatic or require a user's cooperation.

Beyond authentication of a particular user or device to enable control of an object, embodiments of the present invention may also provide for control of authority, meaning how one or more of multiple possible controlling mobile devices are authorized to control an object (separate from, but possibly in combination with, whether or not such mobile devices or their users are required to be authenticated by any particular implementation of systems and methods of the present invention as described above). For example, in one embodiment, control authority over a particular object is granted only to the most recent mobile device to have tagged the object-associated NFC element. In yet another embodiment relating to control authority, only a mobile device within a certain geographic area or proximity to an object is granted the authority to control the object (and in such an embodiment, the granting of a control privilege might be further limited to when the mobile device remains within the certain geographic area or proximity to the object). In yet another embodiment, control authority might be granted to a device or user only during a particular time range (e.g., work shift), or for a particular duration after first use of a particular RCUI to control a particular object, for example. In other embodiments of the present invention, control authority might only be granted to a device or user to control a given object based on whether a mobile device is the first device to tag an object-associated NFC element or, alternatively, if a mobile device is the last device to tag the object's object-associated NFC element, for example (and in the case where the mobile device is the first device to tag an object in order to be able to control it, control authority might further be limited to a certain amount of time, or maintaining proximity to the object, for example). In yet another embodiment, control authority may be granted to a most senior user, e.g., a user with highest experience, rank, or other tiered rating or credential. A practical example of control authority might relate to a media or entertainment system, such as one commonly found in a home, or one commonly found in front of a seated passenger on a commercial airplane. In such an example, a first user could tag an object-associated NFC element with a first device to be able to control the object using the first device. Later, a second user could tag the same object-associated NFC element with a second device to control the same object with the second device, and the first device's control authority would be voided (e.g., the first device would no longer be able to control the object). In another scenario, the first device's control authority lasts for the period of time when the device is in proximity to the object, or for a limited period of time (e.g., an hour, duration of a flight, an amount of time that a user has paid for, such payment mechanism which may be incorporated into a method of the present invention) following initial tagging of the object, for example. It should also be noted, relating to authentication and control authorization, that there may be instances where more than one mobile device could be controlling an object, or aspects of an object, at the same time. This could happen relating to control any of a variety of objects, including but not limited to machinery, manufacturing equipment, computers, transportation means, entertainment and gaming systems, etc. For example, different mobile devices and their users might simultaneously control (e.g., in cooperation, as a crowd-sourced) an object, or different mobile devices and their users might control different controllable aspects of an object, at the same time (and may also, for example, be able to trade off control). Many variations of embodiments of authentication and control authority are within the scope of the present invention.

Embodiments of the present invention may be used in any of a variety of ways, and for many different purposes. Sample applications include remote control of (among other things): consumer electronic devices, entertainment systems (both residential and commercial, such as those found on aircraft), commercial electronic devices, office equipment, manufacturing processes, transportation means, wheeled craft, sea craft, aircraft, medical devices, medical instrumentation, explosives or other dangerous materials or processes, doors, access portals, tubes, pipes, materials, living organisms, and more. To the extent that an object controller can control any aspect of a thing or process, the thing or process may represent an embodiment of an object of the present invention.

Features of embodiments of the present invention may include, without limitation, the identification of an object (or environment) to be controlled by means of approximating a mobile device with the object or a tag associated with the object; upload to the mobile device of a remote control user interface (or instructions or other information that leads to the creation of such a remote control user interface) that is specific to the object and/or the user (e.g., at least partly based on a user's behaviors or preferences); presentation of a remote control user interface by the mobile device that enables control of an object; and facilitation of control of the object (per the inputs provided by a user at the mobile device) by means of wireless communication between the mobile device and a network such as the Internet or similar network. In addition, embodiments of the present invention may enable the mobile device to provide feedback to a user, such feedback based on sensing at, or information about, the object. The inclusion of authentication by some embodiments of the present invention enable access control and customization, such as by permitting some users (but not others) to be able to have a RCUI uploaded to a mobile device in the first place, to have a RCUI functioning on the mobile device, to have certain RCUI control elements present (or not), or to have certain RCUI elements enabled (or disabled). In addition, the present invention may enable one or more remote control user interfaces on a given mobile device, either to be presented and used one at a time, or simultaneously. Embodiments of systems and mobile devices of the present invention may facilitate presentation and use of a RCUI "on the fly" (e.g., single use), or may store a library of user interfaces that are accessible to a particular user or device. A RCUI may, according to embodiments of the present invention, be user manipulated (e.g., a user may be able to reconfigure a presentation of RCUI control elements, including moving them around or deleting any that are unnecessary or not used) or otherwise customized by or for a particular user or device, or even according to circumstances such as the location, behavior or other sensed attributes relating to a user. Many variations to these and other features of the present invention are possible.

In general, embodiments of the present invention offer many benefits. As one example, embodiments of the present invention enable a user to access relevant remote control user interfaces (meaning, for example, a remote control user interfaces that are specific to control of particular target objects), on a mobile device, for one or more objects that the user desires to control—all by means of a NFC initiated physical approximation of the user's mobile device and an object-associated NFC element (as noted, other types of interactions are also within the scope of the present invention). As another example of benefits of the present invention, embodiments of the present invention enable mobile device users to remotely control objects by means of wireless communication with a remote server, rather than directly (meaning direct communication between a device and an object, such as would be the case with a current television remote control). This has many benefits, including the ability to use information other than that which would be available in a direct interaction between a mobile device and an object. Embodiments of the present invention allow a mobile device user to possess and use different remote control user interfaces for each of many different objects, providing remote control user interfaces that are most relevant to each target object. Embodiments of the present invention also benefit users by enabling revisions and updates to remote control user interfaces for particular objects, possibly either automatically or manually based on a user's behaviors or preferences. Another benefit of the present invention relates to user authentication, which may be provided in any of a variety of ways that are not possible using conventional remote controls. Another benefit of the present invention relates to control authority and the ability to provide various approaches (including combinations of approaches) to enable different users control that same object in any of a variety of ways. Ultimately, embodiments of the present invention benefit users by enabling them to use a personal mobile device (rather than one or more other devices) to control one or more remotely controllable objects using remote control user interfaces that are specific and relevant to each object. In addition, features of embodiments of the present invention including but not limited to modification of a remote control user interface according to a user's preferences or behaviors, and also the application of any of a variety of authentication and control authority schemes, provide other useful benefits. Many other benefits are attributable to embodiments of the present invention.

Proximity-Enabled Remote Controls of the present invention, and possibly other remote controls (e.g., remote controls that are not proximity enabled) are useful in a wide range of use cases. For example, a use case may involve a remotely controllable object, such as a television or lighting system, that is accessible by multiple devices (e.g., controllable by a remote control user interface on each device), such as a first mobile device that is associated with a first user, and a second mobile device that is associated with a second user (whereby the first mobile device and the first user, and the second mobile device and the second user, are not the same). For example, in a residential family room setting, a first user may wish to change the channel on a television at a first moment in time and using a first remote control presented on a first device (e.g., the first user's mobile device), and a second user may wish to later change the channel on the same television at a later moment in time using a second remote control presented on a second device (e.g., the second user's mobile device, which, as noted, is distinct from the first user's mobile device). As another example involving the same users and the same object, a first user may wish to change the channel on the television at a first moment in time and using a first remote control presented on a first device (e.g., the first user's mobile device), and a second user may wish to change the volume on the same television at the same first moment in time using a second remote control presented on a second device (e.g., the second user's mobile device which, as noted, is distinct from the first user's mobile device). As previously described, such control may be enabled by means of a remote control user interface along with other systems and methods of embodiments of the present invention. Such use cases are in stark contrast to the use of a single infrared remote control that needs to be physically passed from a first user to a second user in order to enable each of the individual users to remotely control the remotely controllable object, such as the television used in the examples above. Such an infrared remote control that is associated with a single object (and notably, the object is associated with only one remote control) does not enable different users to control different aspects of the same object at the same time, for example, nor does it allow different users to control aspects of an object at different times without physically 'handing off' the remote control. Accordingly, the present invention provides novel systems and methods for remote control of objects by multiple users (e.g., a first user and a second user) using distinct remote controls (e.g., a first remote control implemented on a first device, and a second remote control implemented on a second device that is not the first device). While several representative embodiments are described herein, many variations of these representative embodiments are possible and anticipated by the present invention in order to enable unique user benefits.

Figure 4A:
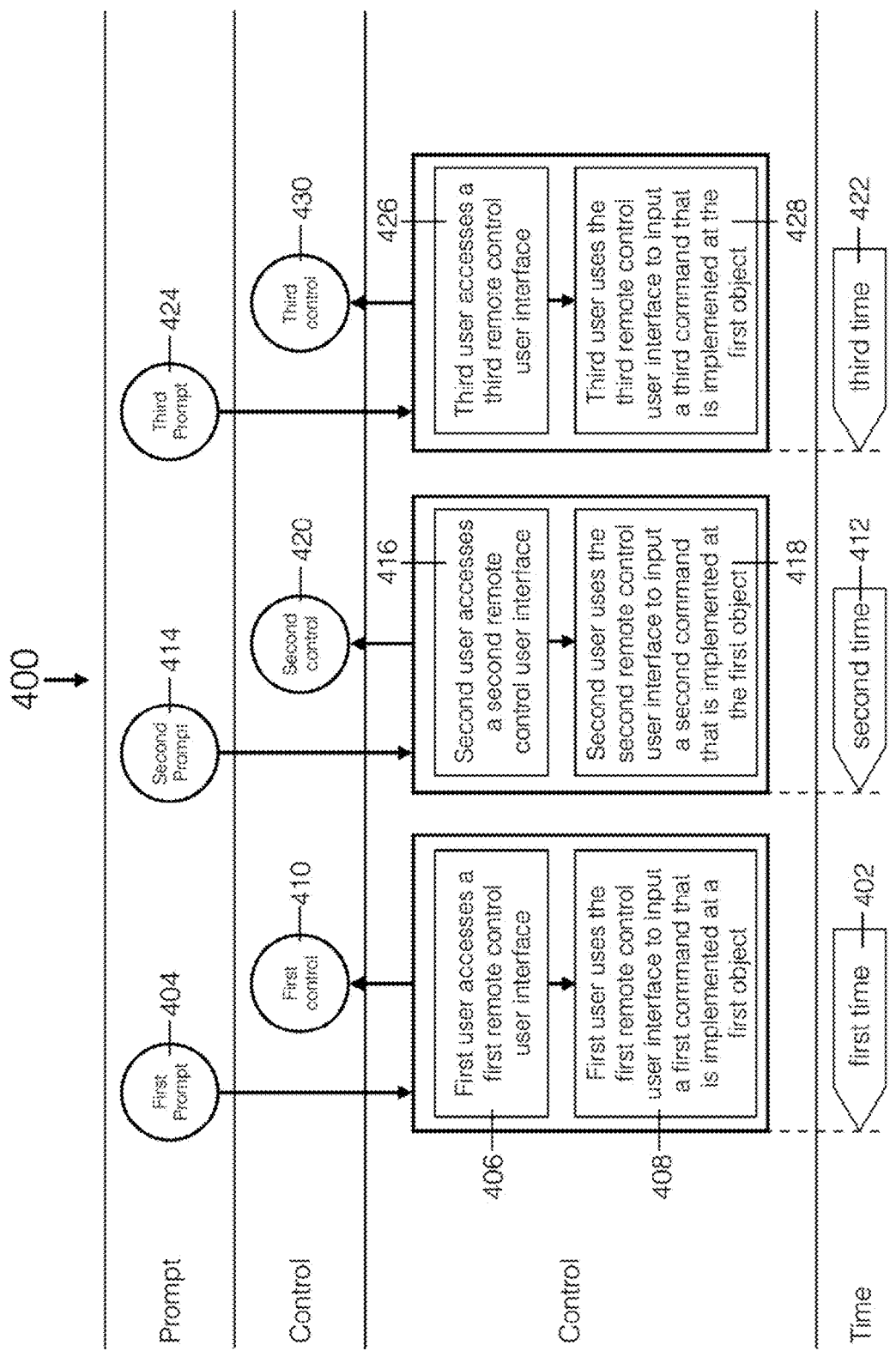
FIG. 4a shows a representation of an embodiment of a first control authorization method of the present invention.

A first possible embodiment 400 of a control authority for transferring control between a first remote control and a second remote control is represented in FIG. 4a. Such remote controls of embodiment 400 may be proximity-enabled remote controls as described by the present invention, non-proximity-enabled remote controls, or combinations of these. This first embodiment 400 involves, at a first time 402, the presentation of a first prompt 404. The first prompt 404 may be, for example, a presentation of a first remote control user interface on a display of a first wireless communication device being used by a first user. First prompt 404 may be caused by any of a variety of causes, including but not limited to: a determination of proximity between a device and an object, a determination of proximity between two devices, a determination of proximity between two objects, a determination of proximity between a device and a location, a determination of proximity between an object and a location, a user action, a user input, a user behavior, a user physiologic measure or state, a time of day, a duration, and more, or some combination of these. Various other types of first prompts, including but not limited to visual, auditory or tactile encouragement or enablement for a user to access a remote control user interface or remote control user interface element (and subsequently provide input to such remote control user interface or element), are possible and anticipated by the invention. Notably, such prompts relate to embodiment 400, as well as other embodiments of the invention (including embodiments shown in FIGS. 4b, 5a, 5b). Following the first prompt 404, the first user accesses the first remote control user interface 406 (implemented on the first user's device, for example) and uses the first remote control user interface to input a first command to be implemented at a first object 408. The first user may provide an input to the remote control user interface to turn an object on or off, increase a volume of an object, change a channel of an object, cause an object to open or close, or instruct an object to move or change location, as examples. Many other inputs (e.g., commands, instructions) are possible and anticipated by the invention. This enables the first user to use the first remote control user interface on a first device to remotely control a first object, as represented by first control 410 (notably, first control 410 occurs after first time 402 and before second later time 412). Subsequent to first control 410, at a second time 412 (e.g., 10 seconds later, 5 days later, 27 months later), a second prompt 414 (which may be of the same type, or a different type, as the first prompt 404) enables a second user to access a second remote control user interface on a second device 416, such that the second user thereby uses the second remote control user interface to input a second command that is implemented at the first object 418, such that the first user assumes second control 420 of the first object. This process may then continue with other devices, remote controls and users. For example, at a third time 422 following the second time 412 and second control 420, a third user (which may be the first user or a new user) may be provided with a third prompt 424 (which may be of the same type, or a different type, as the first prompt 404 and second prompt 414). The third user accesses a third remote control user interface 426 and inputs a third command that is then implemented at the first object 428, thereby exercising third control 430 of the first object. Variations of embodiment 400 are possible and anticipated by the present invention.

An example of a use case that uses the embodiment of a control authority scheme as shown in FIG. 4a may be represented by the family television example above. A first user, the father, uses his wireless communication device to turn on a television and change or input a channel (he accesses a first remote control user interface on his device to enter commands, for example) at a first time. Then, at a second time that follows the father's control of the tv, a second user, the daughter, uses her wireless device and a remote control user interface presented on her device to adjust the volume. Next, at a third time that follows the daughter's control of the tv, a third user, the son, uses his wireless communication device and a remote control user interface implemented on his device to turn the television off. In this example of an embodiment, a device with access to a remote control user interface for a particular object may be used (at any time or possibly only when in proximity with the object or when a user is permitted to control an object, for example) to control the object, and control authority is transferred from one such device to the next. This particular embodiment represents 'distributed' or 'shared' remote control of an object, with multiple remote control devices (and their respective users) having the possibility to exercise control over the same remotely controllable object. In this embodiment, a first user might enhance or counter the action of a second user. Variations of this embodiment are possible, including but not limited to limiting access to only certain devices or certain users, based on certain conditions (e.g., proximity, time of the day, day of the week, permission, if the user has completed her homework, the weather, security conditions, and more). Such variations, including but not limited to the use of limitations and permissions, are possible and anticipated by the invention, and may relate to embodiments shown in FIGS. 4a, 4b, 5a, 5b, and other embodiments.

Figure 4B:
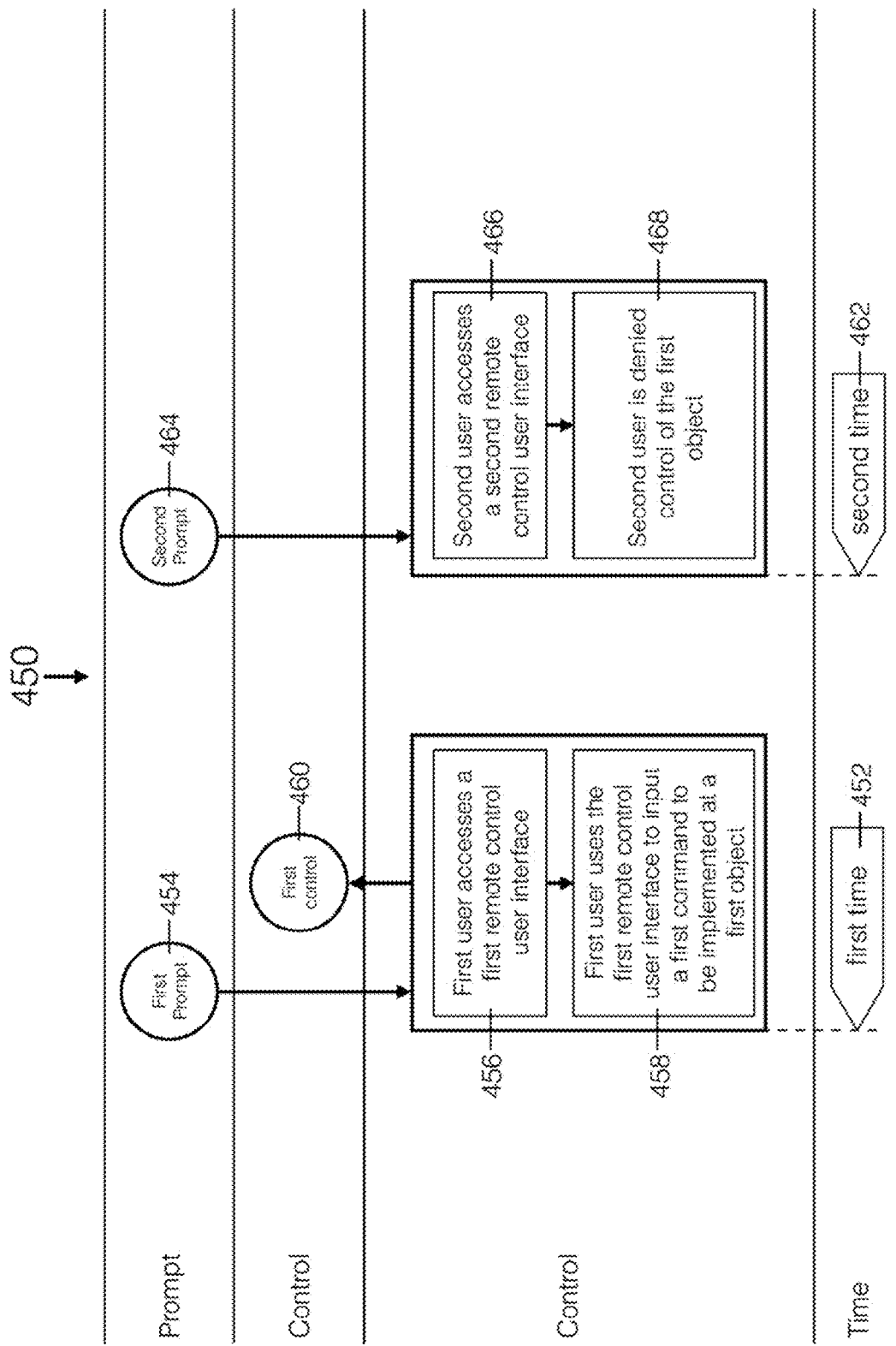
FIG. 4b shows a representation of an embodiment of a second control authorization method of the present invention.

FIG. 4b shows another possible embodiment 450 relating to control authority. At a first time 452 a first prompt 454 is presented to a first user. As noted, a prompt of the invention may take any of a variety of forms. For example, first prompt 454 may be a presentation of a remote control user interface on a display of a wireless device, based on a determination of proximity between the device and an object that will be subject to control by the device (the determination of proximity may be determined by the object, the device, or another element of a system of the invention). The first user accesses a first remote control user interface 456, and uses the remote control user interface to input a first command to be implemented at a first object 458, to thereby give the first user first control 460 of the first object. At a second time 462, following first control 460, a second user is given a second prompt 464. In this embodiment 450, despite the second user being able to access a second remote control user interface (on the second user's wireless communication device, for example) 466, the second user is denied control of the first object 468, meaning that the first user cannot control the first object. Such denial may be implemented in any of a variety of ways. For example, a notice may appear on (or atop) a visually displayed remote control user interface stating "access denied," or other word(s) or symbols to this effect. Alternatively, the control elements (one or more of them) on the remote control user interface may be disabled, which could be presented as grayed-out controls, or controls that have been colored red, or controls that are altogether absent (removed), for example. These are examples, and other means for communicating that a remote control user interface (or one or more particular control elements) have been disabled (e.g., not available to the user) are possible. As a further example, a remote control user interface may not appear at all (meaning it is not presented to the user in the first place, for example), and may be replaced by a notice to the user, for example. Embodiment 450 may be valuable, for example, when a first user's control of a remotely controllable object is intended to remain in place, for at least as long as the first user is using his or her remote control user interface to control the object, or for as long as a system of the invention enables the user to use his or her remote control user interface to control the object.

As one example of embodiment 450, a first user and a second user may have booked the same hotel room for different days, and both secure access to a remote control user interface to control various objects in the hotel room, such as entertainment, environmental and lighting systems (perhaps they had each separately previously stayed at the hotel or even in the same particular room). If a first user has control of the room because he is the current occupant of the room (and the second user is not the current occupant of the room), then, according to this particular embodiment of a control authority of the present invention, only the first user will be able to control the objects in the room using a first remote control user interface, and the second user is denied the ability to control objects in the hotel room at that time, e.g., during the period of time when the first user is the occupant of the hotel room. After the first user departs the room (at the end of his stay, for example) the first user's control authority expires (e.g., his control authority is disabled and he can no longer use his remote control user interface on his device to control objects in the room), and after the second user enters the room (at the start of her stay, for example) the second user's control authority begins (e.g., she can use her remote control user interface on her device to control objects in the room until she departs the hotel room at the end of her stay, for example). Such remote control may be subject to other limitations, permissions, rules or processes of the invention (and this may be the case for other embodiments of the invention), including but not limited to proximity enablement (e.g., a proximity-enabled remote control, such as one that is used in combination with a control authority concept of the invention), for example. An embodiment of a system of the present invention may determine or otherwise assign which one (or more) users is given the ability to control particular objects, and which other one (or more) users does not have the ability to control particular objects. Such limits, permissions and assignments may be changed to give different users (or different groups of users) the ability to remotely control different objects at different times, based on any of a range of factors. A few examples of such factors include, but are not limited to: proximity to an object, the time or a period of time, a rule, determination of an algorithm, weather condition, health condition, proximity of another person or device, user physiologic parameter, user behavior, and more. As noted, such factors (e.g., limitations, permissions, rules, assignments) may apply to this embodiment 450, as well as other embodiments of the present invention.

Figure 5A:
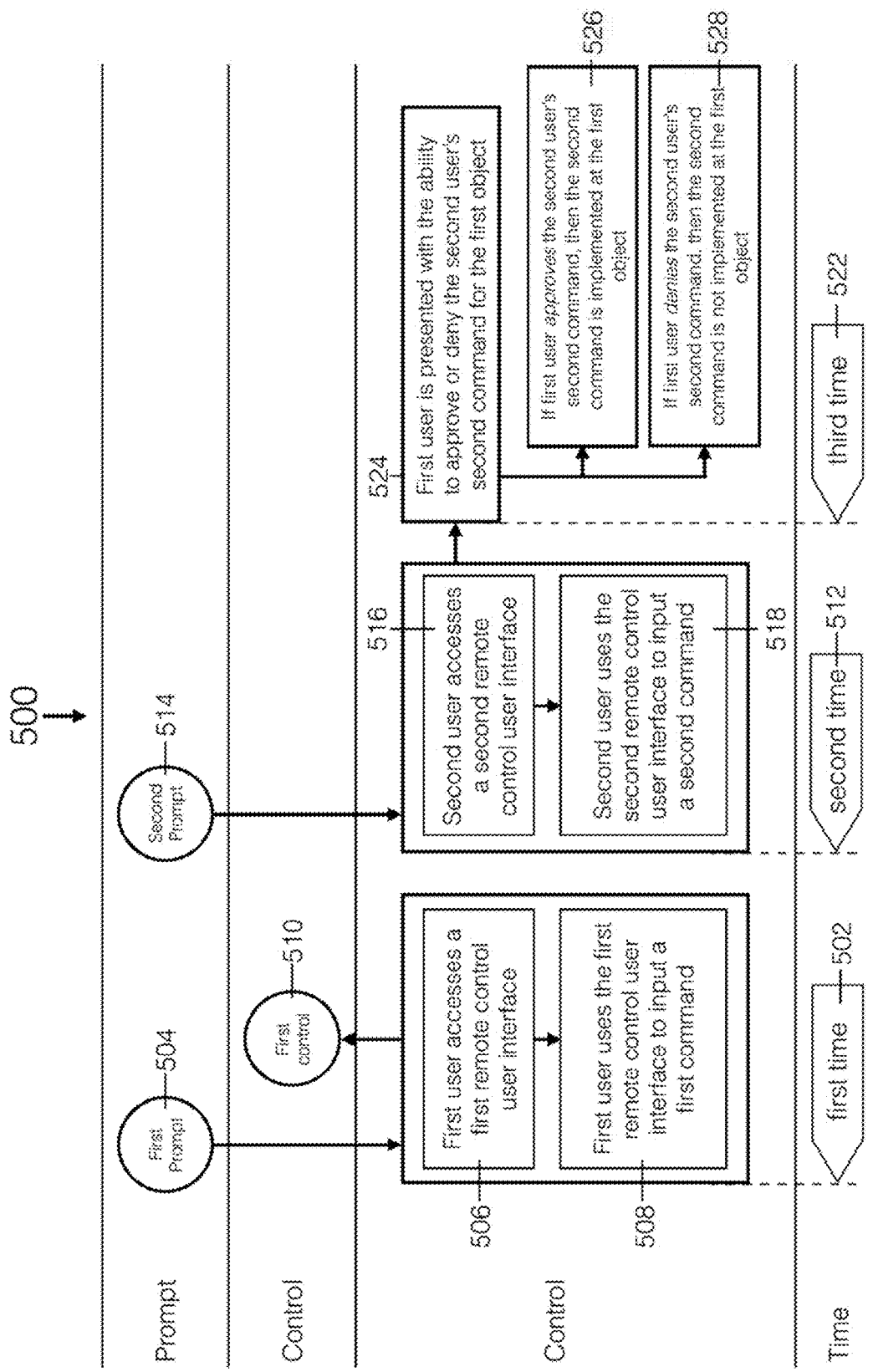
FIG. 5a shows a representation of an embodiment of a third control authorization method of the present invention.

In yet another embodiment of the invention, shown in FIG. 5*a*, control authority may be implemented in another way. Embodiment 500 shows, at a first time 502, a first prompt 504, such as a first remote control user interface presentation to a first user on a display (or otherwise) at a first device, the first user accessing the first remote control user interface 506 to use the first remote control user interface to input a first command 508, in order to secure first control 510 (e.g., in order to have the first command implemented at the first object). Next, at a second time 512 that follows first control 510, a second prompt 514, such as a second remote control user interface presented on a display of a second wireless communication device (that is not the same as the first wireless communication device), is generated for a second user, and the second user accesses the second remote control user interface 516 in order to use the second remote control user interface to input a second command 518. In embodiment 500, a next step at a third time 522 following step 518 is that the first user is presented with the ability to approve or deny the second user's second command (an input or instruction that is intended to control an aspect of the first object, such as its movement, for example) 524. The first user may then approve the second user's command 526 in which case the second user's command is implemented at the first object, or the first user may deny the second user's second command 528 in which case the second command is not implemented at the first object. In this embodiment, the first user may receive a notice that "User 2 desires to implement command Y at object Z . . . please approve or deny this request" (or other words or type of notice to this effect), following which the first user may approve or deny the request using input means associated with the first user's remote control user interface, or by using other means of a system of the present invention, for example. Such notice to the first user may be presented (and a response received) using any of a variety of notification output and response input means and methods. Variations in this embodiment are possible and anticipated by the present invention, including but not limited to the methods and details relating to device or other communications with each of the respective users.

Figure 5B:
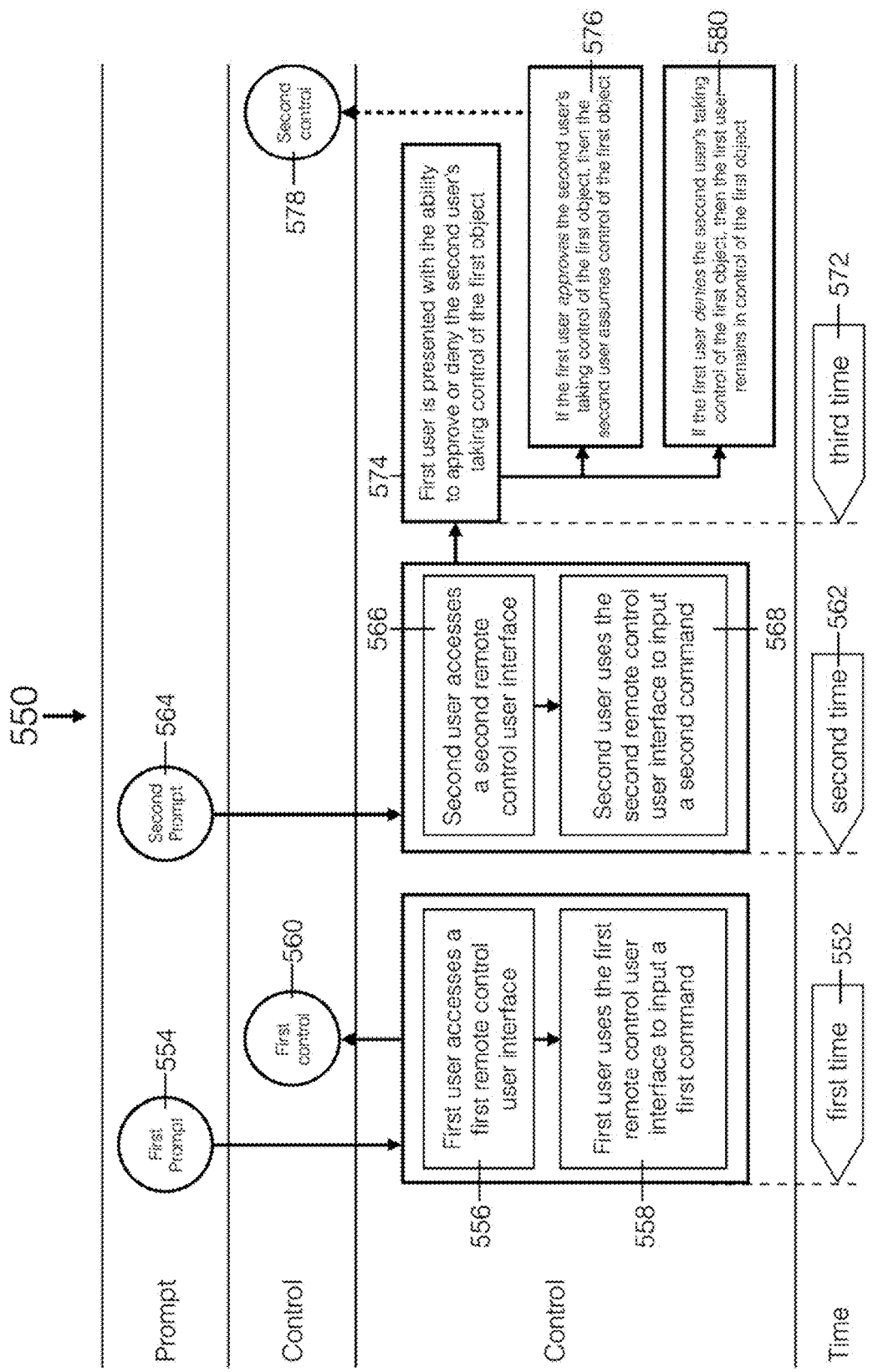
FIG. 5b shows a representation of an embodiment of a fourth control authorization method of the present invention.

Notably, in the embodiment shown in FIG. 5*a*, the first user retains control of the first object, even following approval of the second user's control (command or instruction) relating to the first object. In embodiment 500, the first user not only controls whether or not the second user's command will be implemented at the first object, but also controls the object subsequently, including any further inputs by the second user or any other user. Embodiment 500 offers benefits to users in certain situations. FIG. 5*b* shows another possible embodiment 550, in which command of the first object is transferred from the first user to the second user as a part of the method represented. It should be noted that embodiments 500 and 550 are not mutually exclusive, e.g., embodiments of the present invention are possible that combine features of these two embodiments (and possibly other embodiments), such as an embodiment whereby a first user may approve a command by a second user and either simultaneously or subsequently retain or transfer remote control of the first object to the second user. In embodiment 550, at a first time 552, the first user is presented with a first prompt 554 and the first user accesses a first remote control user interface 556 to use the first remote control user interface to input a first command 558 that enables first control 560 (e.g., implementation of the first command by the first object) by first user. At a second later time 562, after step 560, a second prompt 564 is presented to a second user who accesses a second remote control user interface 566 to input a second command 568. Next, at a third time 572, the first user is given the opportunity to approve or deny the second user's assumption of control of the first object 574 (e.g., first user is given an option to transfer control of the first object to the second user). If the first user approves, then the second user assumes control of the first object 576, meaning that control of the first object is transferred from the first user to the second user. Alternatively, if the first user does not approve (e.g., denies the request), then the second user does not assume control of the first object 580, meaning that transfer of control from the first user to the second user does not take place at approximately the third time (although this and also other embodiments of the present invention anticipate that transfer of control may happen at another later time, for example, possibly following a subsequent prompt to the second user and approval at that time for the transfer by the first user). Notably, many variations of this and other embodiments of the present invention are possible. For example, following a first prompt, a first user does not need to necessarily enter a first command in order to have first control of a first object (the first user may, for example, achieve first control of the first object simply by launching a remote control user interface, being in proximity with the first object, or by other means, and the first user may not actually provide an input to control the first object, for example). In another variation of embodiment 550, for example, a second user may initiate (e.g., by means of the second user's device) a request for control of an object without having to provide a command to control the first object (meaning that a request for control of an object may be separate from a request to implement a specific command at that same object). A use case example of embodiments discussed might occur in an office setting, for example. A first user may be using a first remote control user interface on a first wireless communication device to control a remotely controllable digital projector (to show a slide show to her colleagues, for example), and at some point in the presentation the first user desires to hand off the presentation to a second user, who desires to use a second remote control user interface on a second wireless communication device in order to control the same projector. After the second user is prompted (by seeing a remote control user interface for the projector on his device, for example), the second user enters an input—and the first user is notified and approves the second user's use of the projector, thereby transferring control of the projector (the first object, in this case) to the second user. Embodiments may be implemented in any of a variety of possible ways. For example, instead of a second user using a control element of a remote control user interface, there may first (as the prompt and as part of the remote control user interface) be a notice presented to the second user noting that another user has control of the object, and asking the second user to indicate a desire to control the first object (this embodiment would be optimal for certain situations, such as when multiple user desire control of a particular object, or certain objects benefit from control by any one of several users, for example). Many other variations of these embodiments are possible and anticipated by systems and methods of the present invention. The representative embodiments shown provide examples of how systems and methods of the present invention may enable multiple users (who are using different remote controls implemented on different devices) to control a single object. The representative embodiments shown also offer examples of how systems and methods of the present invention enable a group of one or more users to transfer control of an object to (or share control of an object with) another group of one or more users in an orderly manner. Such embodiments of systems and methods of the invention provide significant benefits for users of remote controls implemented on a variety of devices.

Control authority embodiments of the invention may vary from the embodiments described in any of a variety of ways. For example, in certain embodiments of the invention, remote control authority may involve proximity enablement (as part of a system or method that includes proximity-enabled remote control, for example), whereas other embodiments may not involve proximity enablement. It is also notable that embodiments of the invention may anticipate the possibility that a user who has control authority following a prompt may not actually provide an input or command to be implemented at a target object. In such embodiments, a subsequent prompt may occur, and another user may assume control (or be denied control) of the object. In other words, in certain embodiments a first user's control authority may be sufficient to then enable (or disable) a second user's control authority, for example. It should also be noted that control of an object may mean control of a particular aspect of that object (and not necessarily control of every controllable aspect of an object) in some embodiments. For example, it is possible to transfer the control of one aspect of an object from a first user to a second user, while the first user retains control of other aspects of the same object. This could be achieved by methods that relate to a single remote control user interface element, for example. As a practical example, I might transfer control (for a single control instance or, longer-term control duration, or otherwise) of the volume aspect of my television to my wife, while I retain control of the channel selection, or vice-versa. Whereas some descriptions of embodiments of the invention may reference a "remote control user interface," they could just as easily reference an individual "control element of a remote control user interface" (such as to control the single aspect of the object that's controllable by means of that particular control element), or a group or subset of such control elements. This makes sense since a remote control user interface is a collection (or group) of control elements, which may be arranged or rearranged by a developer or possibly even a user in certain embodiments. This is a valuable feature of the present invention in order to distribute control (various aspects of control) of an object among multiple users. Benefits of such embodiments, or variations of the described embodiments, enable multiple users to share in the control of a remotely controllable object, for example. This is in addition to other benefits provided by control authority systems and methods of the present invention, irrespective of whether they are used with proximity-enabled remote controls or mobile remote controls more generally. As noted and described, control authority concepts have many possible variations that are anticipated by the present invention.

An example use case that combines proximity-enabled remote control and control authority may be represented by two individuals traveling together—a first user and a second user—who check into the same hotel room together. The first user uses a first mobile communication device on which is implemented a first remote control by means of a first remote control user interface, as previously described. The second user similarly uses a second mobile communication device on which is implemented a second remote control by means of a second remote control user interface. Upon entry at the hotel lobby, the first user's device determines that the first device is in proximity to several remotely controllable objects (e.g., door locks for the hotel room, thermostat and fan, lighting system, and more), some of which are in the users' hotel room, and others of which may be associated with the hotel or room (but not in the room), such as remotely controllable objects that may be located in or around the hotel property. In any case, the first user, based on a determination of proximity based on either the first user's location (as may be determined by a GPS module of the device, or other means) or proximity with a RFID tag of the invention (located near the entry to the room, for example), as examples, is given access to (or automatically presented with) a first remote control user interface on the first device. This first remote control user interface enables the first user to remotely control—using the first device—various objects associated with the hotel. Similarly, the second user's device determines proximity upon entry to the same hotel room, based on a determination that the device is (or has been placed) in proximity with a RFID tag (or similar tag, transmission or beacon means) within or near the entrance to the hotel room, for example. Following such proximity determination, the second user is enabled to use a second remote control and remote control user interface on the second device, empowering the user to control the same or different (possibly based on a profile or other information or permissions) objects that the first user is able to control. The first user uses the first remote control user interface to turn on a few lights in the hotel room, while the second user uses the second remote control user interface to adjust the temperature and fan speed settings in the hotel room, for example. Since these are different objects being controlled, in this example each of the two users has control authority. In this particular example, control authority is (let's say) of the type represented in FIG. 4a, wherein any authorized user may (one user at a time) control an object, or a controllable aspect of an object. For clarity, in a possible embodiment of the invention, if multiple users are attempting to control the same aspects of the same object at the same time, then only a first user that communicates a first command to control a particular aspect of the particular object would have their command implemented at the object, although another user may immediately thereafter input a new command, possibly revising or even negating the command of the first user, for example. To continue with the example of the first user and the second user at the hotel, each of them may go on to remotely control various objects in the hotel room and possibly also around the hotel property using their remote control user interfaces operating on each of their devices. Once proximity no longer exists (or non-proximity exists) between the first device and the hotel property, and between the second device and the hotel property, then the first and second users are no longer enabled to control objects at the hotel property, for example. This disablement may be achieved by disabling user access to a particular remote control or remote control user interface or remote control user interface elements. Such disablement may also be achieved by disabling the control capability of the first and second users' remote controls upon non-proximity. Enablement and disablement of remote controls may include actions taken at a remote server. Other methods of disablement of a remote control, remote control user interface and remote control user interface elements are possible and anticipated by the invention. Upon disablement, as user may be presented with a visual or other notice or other indication that the user no longer has access to (is enabled) to control a particular remotely controllable object or particular aspect of a remotely controllable object. Many other embodiments of systems and methods of the invention, including their respective benefits to users, are possible and anticipated by the invention.

Control authentication relates, in general, to the pairing of a device (or a remote control implemented on a wireless communication device, such as by means of a remote control user interface displayed or otherwise presented on the device) with a remotely controllable object (or multiple remotely controllable objects) in order to enable the control of the object(s) by means of the device (e.g., a remote control that is implemented on the device). In certain embodiments of the invention, control authentication involves the communication of a code through various elements of a system of the invention, such as from a remote server (where the code may be generated and associated with an object to which it is then communicated), to the object, then to a device, and back to the remote server, in order to associate the code originally associated with the object, for example, with the code presented back to the remote server by the device (along with information specific to the device), for example. This enables a system of the invention to pair a device and an object, for example, to enable a remote control implemented on a particular device to control a particular object with which it has been paired. Embodiments of the invention may use a database too, for example, store information about the association of a code and an object (or a device or other element of a system of the invention) in order to determine how to route communications between specific devices and objects, such as by referencing IP address or other similar means. For example, following an initiation event (e.g., a determination of proximity between a device and an object, which may be receipt of a code in certain embodiments) a code may be sent from a remote server to the object, then the object may communicate the code to a device, and the device may then communicate the code back to the remote server (along with information relating to the device, such as its identity or address, for example) such that the remote server now knows to communicate any commands (e.g., inputs provided by a user to a remote control user interface implemented on the device) received from the particular device to the object that it has been paired with (e.g., the object to which the remote server first sent the code). Embodiments of control authentication concepts of the invention enable different unique codes to be issued to elements of the invention so that a particular element does not need to use a single code (or identifier), which may diminish the security (or secure connections) of elements of a system of the present invention, for example. Similar to the concept of control authority, control authentication may be used together with proximity-enabled remote control concepts of the invention, and also with as with remote controls more generally (e.g., remote controls that are not proximity enabled). Control authentication is useful, in general, to associate specific remote controls of the invention with specific objects of the invention, to thereby enable a particular remote control (or group of remote controls) to control a particular object (or group of objects). While several representative embodiments are described herein, many variations of these embodiments are possible and anticipated by the invention.

Figure 6A:
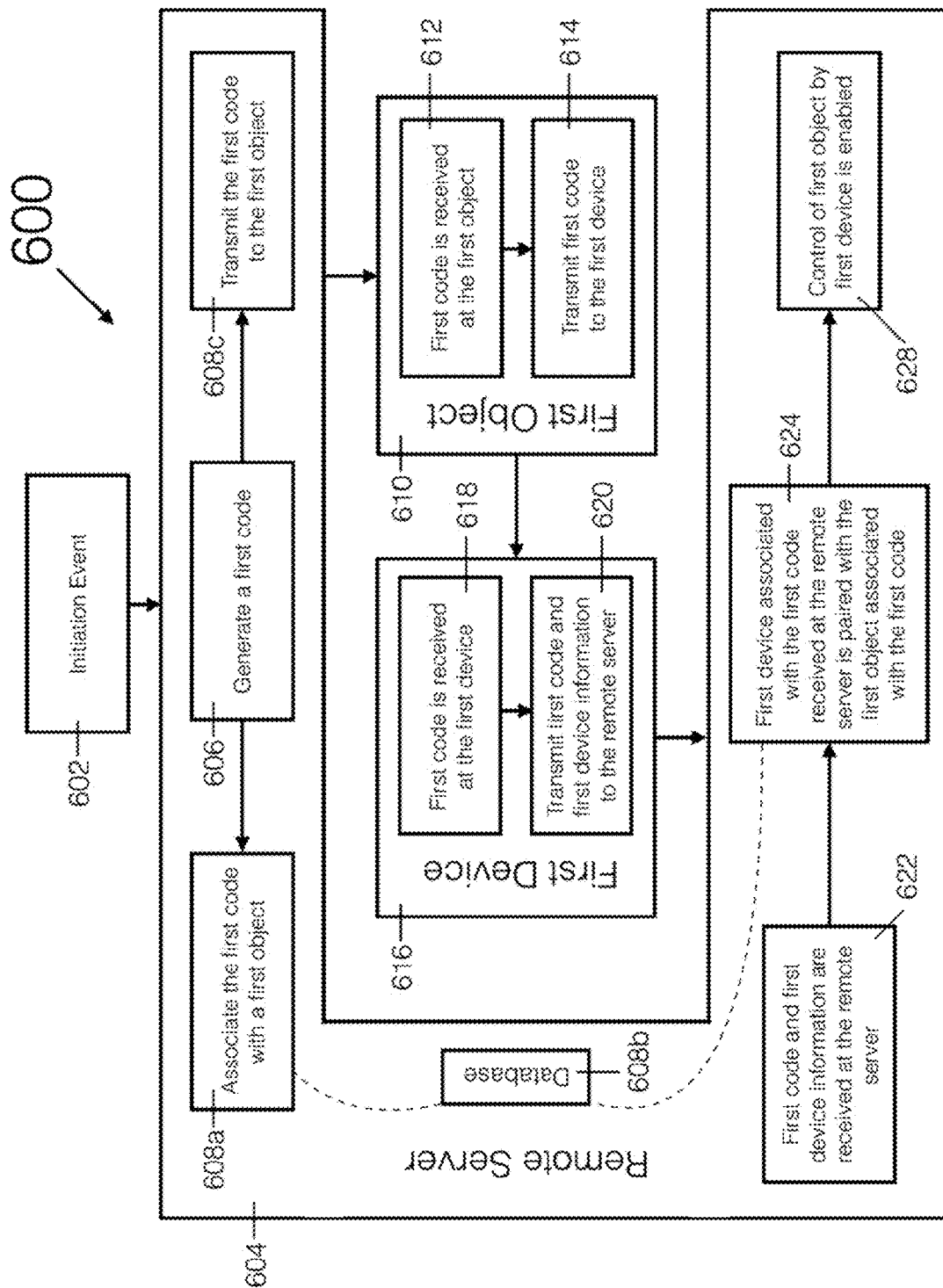
FIG. 6a shows a representation of an embodiment of a first control authentication method of the present invention.

FIG. 6a shows a first embodiment 600 relating to control authentication. As a first step, initiation event 602 is a signal communicated to the remote server 604. The initiation event 602 may be a signal (e.g., ping, query, communication), which may be wirelessly transmitted or otherwise communicated to the remote server 604 in this and other embodiments of the present invention. Initiation event 602 may originate from a first device 616 or a first object 610, or other element of a system of the invention. An initiation event 602 may be triggered (in any of the embodiments of control authorization methods of the present invention) by a determination of proximity between an object and a device, or by a determination that a device is in (or near) a particular location, or by a clock or other timing device, or manually by means of a user input at a device or object, as a few examples. In this embodiment, initiation event 602 signals the remote server 604 to generate a first code 606. The first code is associated with a first object 608a, and such association between the first code and the first object may be recorded in a database 608b (possibly with other information relating to the first object), for example. The first code is also transmitted to the first object 608c by means of a remote server transmission module. In embodiments of the invention, the first code is a unique code that may be communicated securely by means of encryption or other secure communication means during its transmission from the remote server 604 to the first object 610 (and such secure communication means, such as encryption, may be employed for communication of any signals that are communicated between various elements of the invention). At the first object 610, the first code is received 612 by means of an object receiver module and then the first code is transmitted from the first object to the first device 614 by means of an object transmitter module (the object receiver module and the object transmitter module together may be referred to as an object communication module). Wireless communications (transmissions and receptions) between various elements of the invention may be performed in any of a variety of ways and using any of a variety of means (e.g., modules). Such communication may be performed using electronic or electromagnetic transmission and reception systems and methods, e.g., wireless radio communication, using any frequency capable of being used for wireless communication and any standards or protocols capable of transmitting information using such means. Communication may also be achieved using sound (e.g., emission of an audible sound), etc. Such communications may communicate any of a wide range of information, including but not limited to codes, device identity information (e.g., a device identifier), object identity information (e.g., an object identifier), device location (e.g., a physical or geographic location, such as by means of providing latitude, longitude and altitude), object location, device address (e.g., an IP address), object address, metadata, and other information. At the first device 616, the first code is received 618 by a device receiver module. Then the first code is transmitted back to the remote server 620 by a device transmitter module (the device receiver module and the device transmitter module together may be referred to as a device communication module). Information relating to a user may also be shared with the remote server, directly or indirectly, such as by the first device 616. Information communicated from a device may be used, for example, to determine if the first device (or a remote control being implemented on the device), or a user of the device, has permission to access the first object. Notably, in this and other embodiments of the invention the remote server may be a single physical unit or a system of connected or distributed servers that are located in one or more geographic or physical locations. At the remote server 604, the first code and first device information are received 622 by means of a remote server receiver module (note the remote server receiver module and the remote server transmitter module together may be referred to as a remote server communication module). After the first code and the first device information are received back at the remote server in step 622, the first device is then associated with the first object by means of the first code 624, by referencing the association between the first code and the first object in the database 608*b*, for example. This association or 'pairing' of the first device and the first object now triggers systems and methods of the invention to allow communication between the first device and the first object, via the remote server, for example, including but not limited to communication of commands, instructions or other information from the first device to the first object, as well as feedback or other information from the first object back to the first device. From a user perspective, pairing enables a user to input a command (e.g., to increase the volume of a television) by means of a remote control user interface implemented at the first device (being used by the user) to be performed at the first object (e.g., the television volume increases), and also for the user to receive feedback by means of the remote control user interface (e.g., there is an indication that the volume has been increased shown on the remote control user interface), for example. Control of the first object by the first device is enabled 628. A user of the first device 616 may now control the first object 610 using a remote control user interface implemented at the first device, by means of systems and methods of the invention. Such control may continue until control is disabled, which may, for example, follow a trigger such as a determination of non-proximity, or the end of a predetermined amount of time, or a deadline, or other condition or determination. Variations of the embodiment 600 shown in FIG. 6*a* of a method of the invention are possible and anticipated by the invention.

Figure 6B:
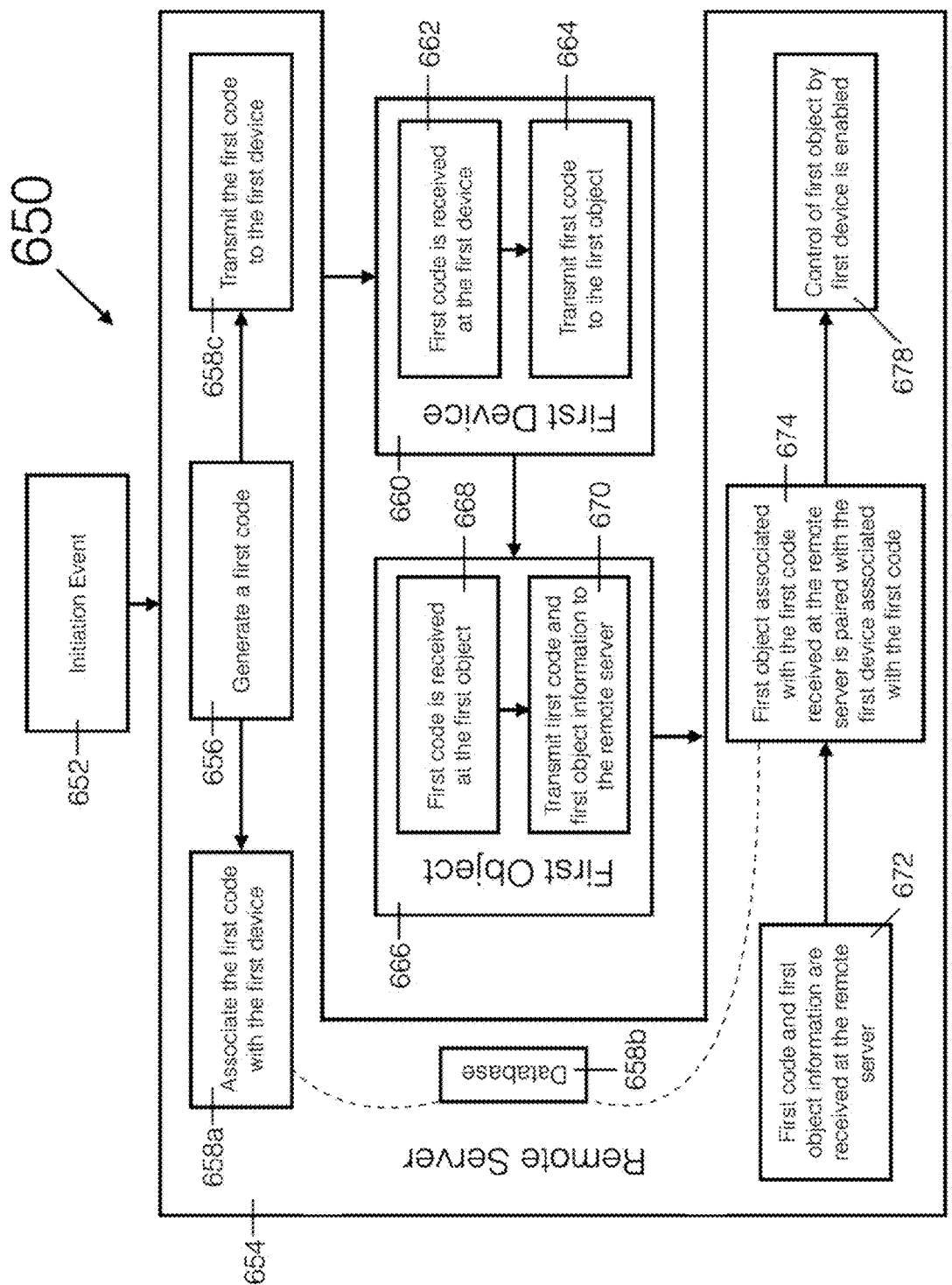
FIG. 6b shows a representation of an embodiment of a second control authentication method of the present invention.

FIG. 6*b* shows a second embodiment 650 relating to control authentication. As a first step, initiation event 652 is a signal communicated to the remote server 654. The initiation event 652 may be a signal (e.g., ping, query, communication), which may be wirelessly transmitted or otherwise communicated to the remote server 654 in this and other embodiments of the present invention. Initiation event 652 may originate from a first device 660 or a first object 666, or other element of a system of the invention. An initiation event 652 may be triggered (in any of the embodiments of control authorization methods of the present invention) by a determination of proximity between an object and a device, or by a determination that a device is in (or near) a particular location, or by a clock or other timing device, or manually by means of a user input at a device or object, as a few examples. In this embodiment, initiation event 652 signals the remote server 654 to generate a first code 656. The first code is associated with a first device 658*a*, and such association between the first code and the first device may be recorded in a database 658*b* (possibly with other information relating to the first device), for example. The first code is also transmitted to the first device 658*c* by means of a remote server transmission module. In embodiments of the invention, the first code is a unique code that may be communicated securely by means of encryption or other secure communication means during its transmission from the remote server 654 to the first device 660 (and such secure communication means, such as encryption, may be employed for communication of any signals that are communicated between various elements of the invention). At the first device 660, the first code is received 662 by means of a device receiver module and then the first code is transmitted from the first device to the first object 664 by means of a device transmitter module (the device receiver module and the device transmitter module together may be referred to as a device communication module). Wireless communications (transmissions and receptions) between various elements of the invention may be performed in any of a variety of ways and using any of a variety of means (e.g., modules). Such communication may be performed using electronic or electromagnetic transmission and reception systems and methods, e.g., wireless radio communication, using any frequency capable of being used for wireless communication and any standards or protocols capable of transmitting information using such means. Communication may also be achieved using sound (e.g., emission of an audible sound), etc. Such communications may communicate any of a wide range of information, including but not limited to codes, device identity information (e.g., a device identifier), object identity information (e.g., an object identifier), device location (e.g., a physical or geographic location, such as by means of providing latitude, longitude and altitude), object location, device address (e.g., an IP address), object address, metadata, and other information. At the first object 666, the first code is received 668 by an object receiver module. Then the first code is transmitted back to the remote server 670 by an object transmitter module (the object receiver module and the object transmitter module together may be referred to as an object communication module). Information relating to the object (e.g., an ambient temperature) may also be shared with the remote server, directly or indirectly, such as by the first object 666. Information from the first device 660 may also be communicated via the first object 666 to the remote server 654 in embodiment 650. Such information might be used to determine if the first device (or a remote control being implemented on the device), or a user of the device, has permission to access the first object. Notably, in this and other embodiments of the invention the remote server may be a single physical unit or a system of connected or distributed servers that are located in one or more geographic or physical locations. At the remote server 654, the first code and first object information are received 672 by means of a remote server receiver module (note the remote server receiver module and the remote server transmitter module together may be referred to as a remote server communication module). After the first code and the first object information are received back at the remote server in step 672, the first object is then associated with the first device by means of the first code 674, by referencing the association between the first code and the first device in the database 658*b*, for example. This association or 'pairing' of the first object and the first device now causes systems and methods of the invention to facilitate communication between the first object and the first device, by means of the remote server, for example, including but not limited to communication of commands, instructions or other information from the first device to the first object, as well as feedback or other information from the first object back to the first device. From a user perspective, pairing enables a user to input a command (e.g., to increase the volume of a television) by means of a remote control user interface implemented at the first device (being used by the user) to be performed at the first object (e.g., the television volume increases), and also for the user to receive feedback by means of the remote control user interface (e.g., there is an indication that the volume has been increased shown on the remote control user interface), for example. Control of the first object by the first device is enabled 678. A user of the first device 660 may now control the first object 666 using a remote control user interface implemented at the first device, by means of systems and methods of the invention. Such control may continue until control is disabled, which may, for example, follow a trigger such as a determination of non-proximity, or the end of a predetermined amount of time, or a deadline, or other condition or determination. Variations of the embodiment 650 shown in FIG. 6b of a method of the invention are possible and anticipated by the invention.

Many variations of control authentication schemes are possible and anticipated by the invention. For example, in the embodiments described above, a remote server generates a code. In other possible embodiments, other elements of a system of the invention may generate a code, including but not limited to a device or an object. In such embodiments, the same element that generates to code may transmit the code to (and through) other elements of a system of the invention, such that the code returns to the element that generated it, for pairing purposes, for example. A code is an identifier that may correlate (or be associated) with the identity of an object or other element of the invention, for example. In certain embodiments, codes are unique to an object or other element of the invention. In certain other embodiments, codes may be randomly generated. A code may also identify a class or group of objects or other elements of the invention (e.g., object having similar attributes, objects of a particular brand, objects associated with a particular owner). A code may be communicated from one element to another element of an embodiment of the invention (e.g., from an object or object associated tag, to a device) in any of a variety of ways, including but not limited to wireless transmission, use of passive or active RFID tags and reader means, near-field communication (NFC) means, optical codes (e.g., bar code, quick-response code) and reader means, optical recognition means, auditory (sound) recognition means, chemical scent recognition means, and more. In certain embodiments, a code may also simply be displayed on one element of the invention (e.g., an object) and manually entered by a user at another element of the invention (e.g., a device). Codes, in addition to being generated identifiers (e.g., a randomly generated or unique alphanumeric identifier), may also be natural attributes of an object (whether or not unique to a specific object or class of objects) that may be determined by a device or other sensor of the invention, for example. Such identifying attributes may be visual, audible, olfactory or mechanical (e.g., relating to operation or movement) in nature, as examples. A code associated with an object may also be generated, or an object identified, in whole or in part, based on the location of the object (or tag associated with the object). As may be seen by these examples, embodiments of the invention may use codes that are created and used in a variety of ways, and these are anticipated by the invention.

Another possible variation relates to the generation of a code or other involvement of a user. For example, a user may be (by means of the user's device) prompted to originate and enter a code, which may then be communicated through elements of a system of the invention, or a user may be prompted to verify or confirm a code that is presented to the user. Other means and methods for user involvement in control authentication are possible and anticipated by embodiments of the invention.

It is also possible and anticipated that a code may be transformed as it is handled by an element of the invention, such as a device or object of a system or method of the invention, and such code transformation (which may be known to the remote server or other component of the invention that is matching the originally generated code and the code that is ultimately received back at the component that originated it, for example) may still be used for matching purposes in order to determine if a device and an object of the invention should be paired, for example. A simple example of this relating to the embodiment 600 shown in FIG. 6a is that a code of "1234" may be generated in step 606. Following receipt of the original code at the first object 610, the code is transformed by adding 1 to it, to thereby create a code of "1235." The same transformation occurs at the first device 616, and the code then becomes "1236." This code is communicated back to the remote server 604 for matching up with the original code generated in step 606. Since (in this example), the remote server 'knows' that the original code will be transformed (by adding 2 to the original number), a match can be determined if the code received at the remote server in step 622 is "1236" while the original code is "1234." If a number other than "1236" is received at the remote server for matching purposes, then (in this example) a match is not made and pairing (control authentication) is not enabled, thereby preventing the first device 616 from being paired with the remotely controllable first object 610. The remote server may have prior knowledge of a transformation, or may be notified that a transformation will take (or has taken) place by means of a communication for an element of the invention, such as the elements that is making the transformation. The concept of transformation of a code (between its point of origination and point of comparison) may be applied to any of the representative embodiments of control authentication described, as well as to other embodiments and variations of the presently described embodiments. As may be imagined, much more complex code transformation protocols (and schemes) may also be used, including the use of fixed or dynamic algorithms to transform codes at one or more element(s) of the present invention, including but not limited to transformations that may take place at a remote server, object and/or device of the invention. User interaction (or information relating to a user) may also be used to transform or confirm a code. In addition, a match may be determined by an algorithm, and does not necessarily need to be an exact match, e.g., a match may occur when a received code belongs to a set of expected or acceptable results. Any of a variety of code generation, security, communication and tracking means may be used with any of the embodiments of the invention, whether disclosed or anticipated, including but not limited to encryption and the use of blockchain or similar records.

The sequence of steps in embodiments of control authentication may also vary. For example, while some steps need to occur in a particular sequence (e.g., the receipt of a code before the transmission of the received code), other steps may be sequenced in an order different from one described in the embodiments above. Steps may also be repeated. For example, multiple codes may be communicated from the same or different elements of an embodiment of control authentication, at the same or at different times. This may be useful for periodic pairing verification, for example. Different codes may also be communicated through elements of the invention via different pathways, for example. This may enable embodiments of the invention to provide added layers of control authentication and security by enabling the pairing process to take place at different elements at different times, for example.

As noted, communication of information within and between elements of the invention may be achieved using any of a variety of means. Embodiments of the present invention may use wireless communication means, such as radiofrequency transmission and reception. Other electromagnetic and non-electromagnetic (e.g., mechanical) means of transmission are also possible for communication of signals or codes. Information may be communicated using any of a variety of standards and protocols. Certain embodiments of the present invention may use encryption to secure the transfer of information. Other embodiments may utilize blockchain or similar records and associated methods.

An example use case that combines proximity-enabled remote control and control authentication may be represented by a user of a mobile communication device who enters an office environment. The user approximates her device to a tag located on a wall of a conference room, thereby establishing proximity (as determined by the invention, as described) and enabling the user to control one or more objects in the conference room by means of a remote control user interface enabled on her device. In this example, control authentication may be achieved by communicating a code, generated by one element of the system, through other elements of the system, and ultimately back to the original element of the system that generated the code, to ensure that the initially generated code and ultimately received code are a match, or are otherwise consistent with expectations or a group of possible responses (the code being received at the end of the process representing a response, for example). In this particular example, the user may approximate her mobile device to a RFID tag located on a wall near the entrance to the conference room (or near the entrance or anywhere in the room). Based on such approximation, the invention may enable access to a remote control user interface on the user's device. This enablement may be in the form of presenting (or making a presentation possible) of a remote control user interface specific to the one or more controllable object(s) in the conference room, or may be by means of simply connecting the device and the object in a way that permits the user to control the object by means of her device. In either instance, remote control authentication may be a part of the process. For example, following a determination of proximity, a code may be generated by a remote server (called the "generated code"), then the code can be communicated to the RFID tag (such as an intelligent 'active' tag, for example), and then the RFID tag may then communicate the code to the user's mobile device, and then the user's mobile device may finally communicate the code back to the remote server (the "ultimately received code"). If the remote server determines that the generated code and the ultimately received code are a match (or that they meet criteria or expectations of an algorithm, for example), then the user is granted control of the object(s) in the conference room by means of the user's mobile communication device and associated remote control user interface. Although this example follows the representative method shown in FIG. 6a, it is easy to envision another embodiment of a method of the invention to be implemented in order to provide control authentication in this example, as well as in other similar examples. Control authentication may be applied in order to either enable (e.g., initiate) control between a device and an object (or multiple objects associated with a single tag or single determination of proximity), or may otherwise be applied to periodically confirm that a device's control of one or more objects should be continued. The latter may be achieved through single or periodic control authentication checks (applications of a control authentication method) following an initial connection that enables a user to control an object by means of a device.

Figures 7A, 7B, 7C:
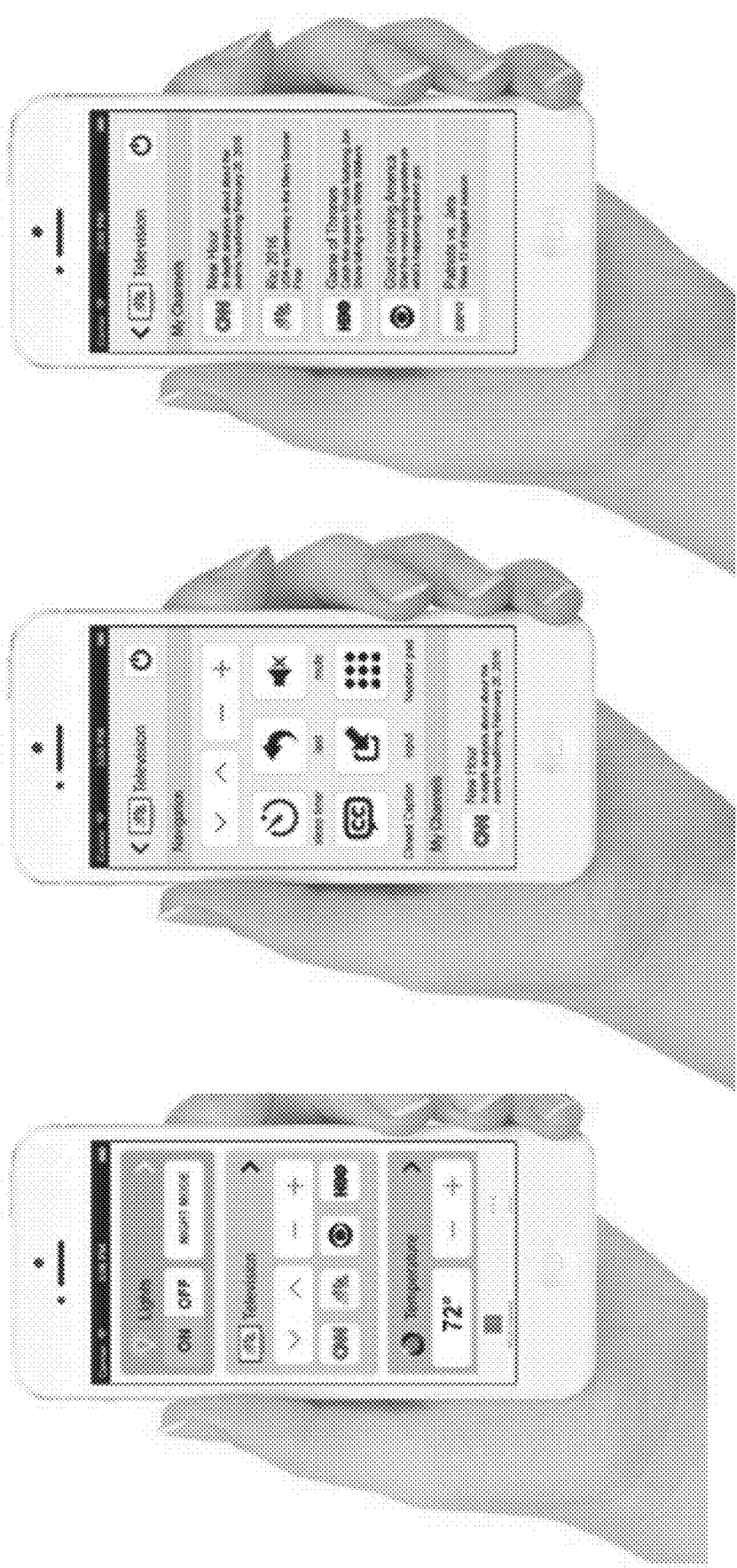
FIG. 7a shows a representation of an embodiment of a first remote control user interface presentation of the present invention.
FIG. 7b shows a representation of an embodiment of a second remote control user interface presentation of the present invention.
FIG. 7c shows a representation of an embodiment of a third remote control user interface presentation of the present invention.

FIGS. 7a-7c show what various possible embodiments of a remote control user interface of the invention may look like (as a visual presentation). FIG. 7a shows a first possible embodiment of a remote control user interface having three control modules, one relating to room lights (enabling the lights to be turned on or off, or placed into "night mode"), a second relating to a television (enabling control of the television's channel and volume), and a third that relates to control of a room temperature (enabling the room temperature to be increased or decreased). While the embodiment of a remote control user interface shown in FIG. 7a may be stand-alone, in the sense that it enables critical remotely controllable operations of various objects, such an embodiment may also be the first screen (presentation) that can lead a user to finer controls. FIG. 7b shows a more detailed remote control user interface for a television, for example. In this embodiment, a user is offered several controls above and beyond channel selection and volume control, such as the ability to horizontally scroll through channels (with images) as shown at the top of the display, the ability to control channel and volume, the ability to turn on (or turn off) a sleep timer, the ability to access a 'last' channel, the ability to access closed captioning, the ability to manage other device inputs, and the ability to access a keypad (perhaps for scrolling around a screen or additional control). While FIG. 7b shows a particular selection of remote control user interface elements, many other elements, presentations of elements, combinations of elements, arrangements of elements, and more, are possible and anticipated by the invention. For example, FIG. 7c shows yet another possible embodiment of a remote control user interface design for possible use by a user to enable instant selection of a particular channel or content item to be displayed on a remotely controllable television or display. As shown in FIG. 7c, various images (such as logos) and information may be shown. As a further example (not shown) even actual real-time video (with or without audio) of a particular broadcast channel (or other type of content) may be displayed, e.g., the CNN portion (which may be a selectable element of the remote control user interface) of the display may actually show real-time video that is the same (or possibly delayed or otherwise altered) content as is being broadcast on CNN live. This gives a user the ability to select actual stories or content in real-time, for example. Any of the remote control user interfaces may be presented to a user in any of a variety of ways, including as a presentation by a device operating system, as a standalone application or 'app' or other software running on a device, as an element of another (not exclusively remote control) application or 'app' (e.g., within a branded hotel app, for example), or even within a chat or social medial application. Presentation or availability of a remote control user interface or remote control user interface elements may be triggered by or based on a determination of proximity between a device and an object (or set of objects, or a tag associated with one or more object), for example. The remote control user interface examples shown in FIGS. 7a-7c are representative only; many other presentations and designs of remote control user interfaces and remote control user interface elements are possible and anticipated by the invention. For example, remote control user interface elements may control one or multiple features of one or more objects. Another example is the control of a 'user experience' that is performed by the coordinated control of one or more aspects of one or more objects.

Figure 8:
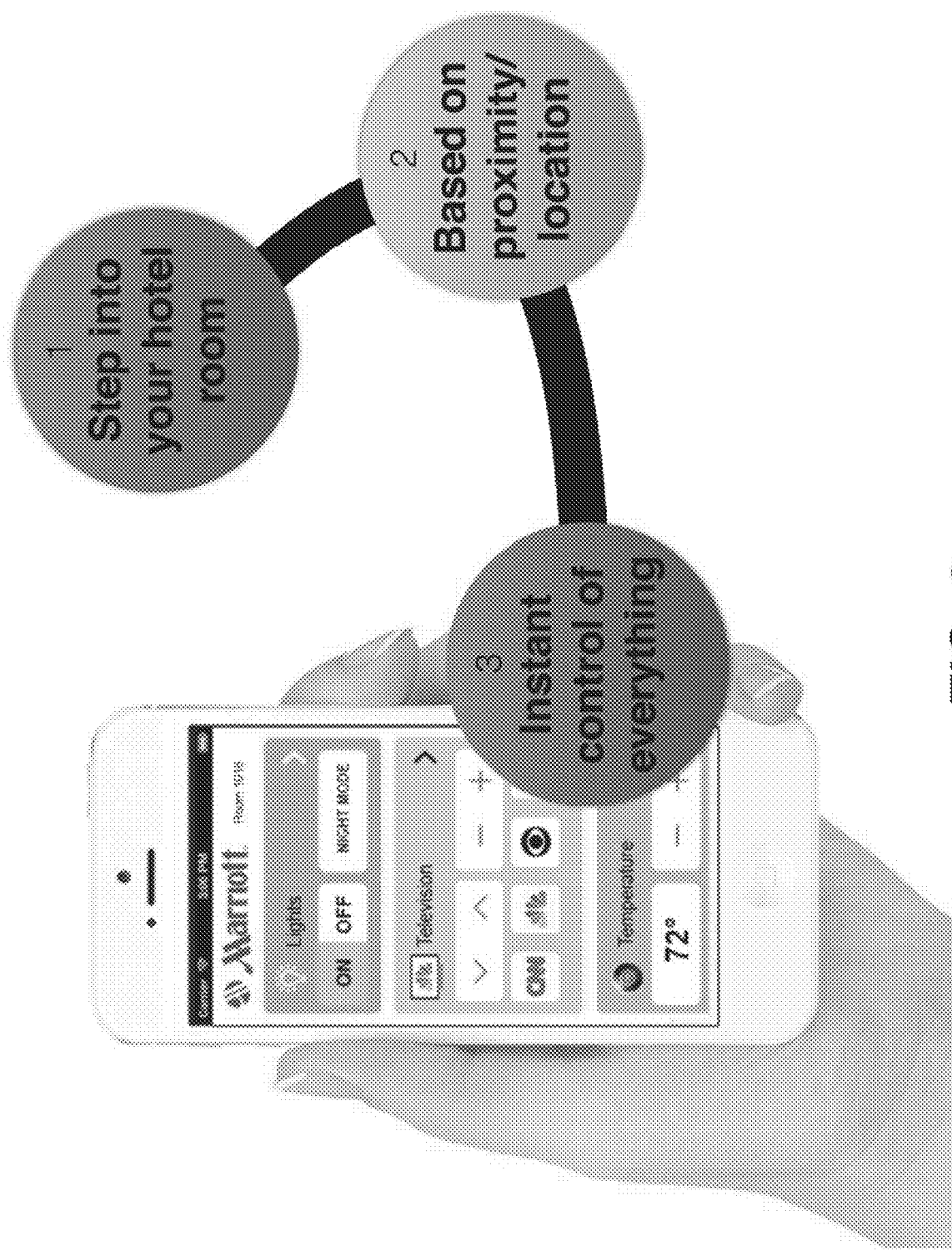
FIG. 8 shows a representation of an embodiment of a fourth remote control user interface presentation of the present invention.

FIG. 8 represents how proximity-enabled remote control systems and methods may be useful in a particular environment, such as a hotel or resort where many different users arrive and depart (using the same rooms, for example) at different times—and require access to remote control user interfaces for the same objects (or sets of objects, such as the objects in a particular room in a hotel or resort) at certain times (such as when staying at the hotel or resort) but not at other times (such as when not staying at the hotel or resort). As FIG. 8 shows, a user may step into a hotel room, for example, and then based on proximity/location (location being one possible proxy for proximity between a mobile device and a fixed-location object or set of objects, for example) lead to instant control of "everything" (in this drawing the word "everything" references a set of items that make up 'everything remotely controllable' in a hotel room, for example). As may be readily imagined, many other embodiments of remote control user interfaces are possible and anticipated by the present invention. While such remote control user interfaces may be visual in nature (e.g., presented on an electronic display), they may also be auditory (e.g., sound-based, such as spoken interaction), movement-based (e.g., a vibration indicating a prompt followed by a movement of a device to indicate a selection or other input of a command to be implemented at an object), or enable remote control of a remotely controllable object by other possible means.

Systems and methods of the present invention may benefit from branded tags, e.g., a RFID or other type of physical tag (with which a device may be approximated) that enables a remote control user interface for a remotely controllable service (or even multiple services) that are associated with the brand appearing on the branded tag. For example, a Netflix branded tag (such as a physical structure housing a RFID tag and having the brand's color(s) and logos or other brand-identifying characteristics appear on a surface of the physical housing of the tag, for example) would be located on a wall in a hotel room. When a user approximates his or her mobile device near the branded tag, a remote control user interface for a service of the brand is enabled on the user's mobile device. Continuing with the Netflix brand example above, a user whose device comes into proximity with a Netflix branded tag would receive access to a Netflix controller, meaning a remote control user interface associated with (and enabling control of) a Netflix service, such as the ability for the user to be able to select and watch a movie or other content on the service by means of using the remote control user interface. The user may, in one possible embodiment, watch the content on a separate device, such as a hotel room's television display. Alternatively, in another possible embodiment, a user may watch the content on the same device as the remote control, e.g., the user's mobile device. Such proximity-based access to (and control of) a service such as Netflix provides many possible benefits to the brand and also the user, including but not limited to convenient access to a branded service, as well as possible goodwill or promotional attributes. For example, access to Netflix service by means of a branded tag and proximity-enablement in a hotel room setting may encourage users to subscribe to the Netflix service, or purchase additional services, including but not limited to movies and other content. As may be imagined, branded tags with proximity enablement of branded services (meaning services of the brand represented on the tag, for example) may benefit many types of brands where proximity enablement is valuable. This may include, without any limitations, brands that deliver electronic content or services (via mobile devices or otherwise), brands that deliver physical products to locations that are determinable by proximity enablement (e.g., room service or the delivery of a product by Amazon to a user who shares his or her current location via approximation of the user's device and a tag of the invention, for example) such as by means of approximation of a device and a RFID tag (or by other means, such as GPS location-based enablement of a remote control user interface implemented on a mobile device and used for commanding the delivery of physical products), and more.

Systems and methods of the invention may also handle consolidated commands. A consolidated command is an input, instruction or command by a user (e.g., by means of input to a remote control user interface implemented on a mobile device) that results in the implementation of the command (or performance of activities related to the command) at one or more objects, either simultaneously or sequentially. An example of a consolidated command is a user input to a remote control indicating the user's desire for a residential room to be reconfigured to watch a movie. In this example, following such a consolidated command, which may be communicated from the device via a remote server to the multiple target objects, the room may be reconfigured by having the lights dim to a preselected level for movie viewing, turning on the television, commanding the television controller to set itself up to play the selected movie (or displaying a screen with the possible movie selections, for example), turning on the popcorn maker, having the family robot deliver the popcorn to the popcorn maker, adjusting the thermostat, closing the blinds, and more. These activities or events may be initiated simultaneously or following some predetermined sequence. The triggering or sequencing of such activities and events may be determined by user-defined setting (predefined or otherwise determined, such as according to user preferences, for example), or by means of an algorithm that may exist centrally (e.g., programmed at the remote server) or operating on software running at any of the elements of a system of the invention, e.g., device, object, remote server. Consolidated commands may represent experiences (e.g., "movie time"), as well as more traditional actions (e.g., turn the television on). Consolidates commands may take a range of forms and may be implemented in a variety of ways. Such variations are possible and anticipated by the invention.

Another example of a consolidated command is represented by an example whereby a user of a mobile device receives a menu of options (e.g., menu of food items, list of products) based (at least in part) on the geographic location of the user (e.g., user's location at a specific geographic location, a specific hotel room, a specific office). For example, the menu of options may be a subset of all possible options (e.g., food items or physical products, or services) available to all users of such a system or method of the invention. For example, if the menu of options is a menu of food items, then only certain items (a subset of all of the items) may be available to the user based on the user's location, or possibly other factors (e.g., time of day, delivery limitations). For example, only certain items may be available in a food preparation center or warehouse that is tasked with (or even just capable of) delivering an item to a user. The user is able to review the menu of available options and make a selection, such as by seeing the menu of options on a mobile device display and providing an input to indicate a selection of one (or more) of the items or products listed in the menu of options. Following such input, the user's selection is communicated via a remote server, to one or more objects in order to implement the user's input and deliver the user's selected item(s) to the user at the user's specific location, as determined by location of the user's mobile device, for example (notably, in some embodiments, a user's initial location may be different from a user's later location, to where the item will be delivered). This is another example of consolidated control, whereby a user indicates a simple desire (e.g., the desire to have a selected item delivered to the user at the user's location) and multiple objects are put into action—possibly by means of algorithms running on a remote server—to physically prepare, move, transport, distribute or otherwise deliver the item to the user. In embodiments of the invention, the user may even be in a moving location, such as a self-driving car, and the item is delivered to the user at the user's present (updated) location. In such embodiments of the invention, a user is presented with a remote control based on the user's proximity to a tag, object or location, and the user's remote control then displays a menu of options (also based on the user's proximity), to enable the user to make a selection from the menu of options, which initiates a series of actions or events that cause the user's selected item (or items) to be delivered to the user. Such delivery may, in embodiments of the present invention, be physical items such as food, beverages, consumer products, or other tangible items. In other embodiments, such items may be intangible in nature. Delivery may be facilitated by a human, or be performed by a robot or autonomous transportation or delivery system (e.g., a robot, self-driving automobile, drone). In some embodiments, delivery may be made to the user at the user's original location. In other embodiments, delivery may be made to another user location, possibly even a moving location, which would be projected or determined by algorithms associated with a remote server or other element of the invention. Many variations of such proximity-based consolidated control embodiments are possible and anticipated by the invention.

It is to be understood that although the invention has been described above in terms of particular embodiments, the foregoing embodiments are provided as illustrative only, and do not limit or define the scope of the invention. For example, while NFC is used to describe embodiments throughout this disclosure, other types and forms of proximity-based identification means are within the scope of the present invention, such as those involving the presentation and reading of bar codes. Various other embodiments, including but not limited to the following, are also within the scope of the claims. For example, elements and components described herein may be further divided into additional components or joined together to form fewer components for performing the same functions. The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices. Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output.

Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, interactive display, or other output medium.

The invention claimed is:

1. A method performed by at least one computer processor executing computer program instructions stored on at least one non-transitory computer-readable medium to perform a method, the method comprising:
 (a) at a first mobile device, at a first time, receiving a first communication, wherein the first communication comprises information representing an identity of a first remotely controllable object;
 (b) at the first mobile device, in response to receiving the first communication, wirelessly transmitting a second communication, to a remote server, wherein the second communication comprises the information representing the identity of the first remotely controllable object, wherein the first remotely controllable object and the first mobile device are physically distinct from each other, and wherein the first remotely controllable object and the remote server are physically distinct from one another;
 (c) at the first mobile device, at a second time after the first time, presenting a first remote control user interface, wherein the first remote control user interface comprises a volume control element to control a volume at the first remotely controllable object;
 (d) at the first mobile device, at a third time after the second time, receiving a first input that indicates a first action to be performed at the first remotely controllable object, using the volume control element, wherein the first action comprises at least one of changing a volume and selecting a volume at the first remotely controllable object;
 (e) at the first mobile device, in response to receiving the first input that indicates the first action to be performed at the first remotely controllable object, wirelessly transmitting a third communication, to the remote server, the third communication comprising information based on the first input; and
 (f) at the first mobile device, after receiving the first input that indicates the first action to be performed at the first remotely controllable object, presenting first feedback relating to the first input at the first remote control user interface.

2. The method of claim 1, wherein the first remotely controllable object comprises at least one of a television, a cable set-top box, a media player, and an entertainment system.

3. The method of claim 1, wherein receiving the first communication comprises using an interactive display at the first mobile device to receive the first communication as an input from a first user.

4. The method of claim 1, wherein receiving the first communication comprises using a microphone associated with the first mobile device to receive the first communication as a voice command.

5. The method of claim 1, wherein receiving the first communication comprises using an optical reader at the first mobile device to receive the first communication as a visual identifier.

6. The method of claim 1, wherein receiving the first communication comprises using a receiver at the first mobile device to receive the first communication as a wireless communication.

7. The method of claim 1, wherein receiving the first input comprises using an interactive display at the first mobile device to receive the first input as an input from a first user.

8. The method of claim 1, wherein receiving the first input comprises using a microphone associated with the first mobile device to receive the first input as a voice command from a first user.

9. The method of claim 1, wherein receiving the first input comprises using the first mobile device to receive the first input as a user manipulation by a first user.

10. The method of claim 1, further comprising:
(g) at the first remotely controllable object, performing the first action.

11. The method of claim 1, further comprising:
(g) at the first mobile device, at a fifth time after the first time, presenting the first remote control user interface, wherein the first remote control user interface comprises a channel control element to control a channel at the first remotely controllable object.

12. The method of claim 11, further comprising:
(h) at the first mobile device, at a sixth time after the fifth time, receiving a second input that indicates a second action to be performed at the first remotely controllable object, using the channel control element, wherein the second action comprises controlling the channel at the first remotely controllable object;
(i) at the first mobile device, in response to receiving the second input that indicates the second action to be performed at the first remotely controllable object, wirelessly transmitting a fourth communication, to the remote server, the fourth communication comprising information based on the second input; and
(j) at the first mobile device, after receiving the second input that indicates the second action to be performed at the first remotely controllable object, presenting second feedback relating to the second input at the first remote control user interface.

13. The method of claim 12, further comprising:
(k) at the first remotely controllable object, performing the second action.

14. The method of claim 1, further comprising:
(g) at the remote server, receiving the third communication, the third communication comprising information based on the first action.

15. The method of claim 14, further comprising:
(h) at the remote server, transmitting a fourth communication to the first remotely controllable object, the fourth communication comprising information derived from the third communication.

16. The method of claim 15, further comprising:
(i) at the first remotely controllable object, receiving the fourth communication; and
(j) at the first remotely controllable object, in response to receiving the fourth communication, performing the first action.

17. The method of claim 14, further comprising:
(h) at the remote server, transmitting a fourth communication to the first mobile device, the fourth communication comprising information derived from the third communication.

18. The method of claim 17, further comprising:
(i) at the first mobile device, receiving the fourth communication; and
(j) at the first mobile device, at the first remote control user interface, presenting information derived from the fourth communication.

19. The method of claim 1, further comprising:
(g) at the first remotely controllable object, displaying a visual identifier that represents the identity of the first remotely controllable object.

20. The method of claim 1, further comprising:
(g) at the first remotely controllable object, transmitting a signal that represents the identity of the first remotely controllable object.

21. The method of claim 1, wherein the information representing the identity of the first remotely controllable object further comprises a code.

22. A system comprising at least one non-transitory computer-readable medium having computer program instructions stored thereon, the computer program instructions being executable by at least one computer processor to perform a method, the method comprising:
(a) at a first mobile device, at a first time, receiving a first communication, wherein the first communication comprises information representing an identity of a first remotely controllable object;
(b) at the first mobile device, in response to receiving the first communication, wirelessly transmitting a second communication, to a remote server, wherein the second communication comprises the information representing the identity of the first remotely controllable object, wherein the first remotely controllable object and the first mobile device are physically distinct from each other, and wherein the first remotely controllable object and the remote server are physically distinct from one another;
(c) at the first mobile device, at a second time after the first time, presenting a first remote control user interface, wherein the first remote control user interface comprises a volume control element to control a volume at the first remotely controllable object;
(d) at the first mobile device, at a third time after the second time, receiving a first input that indicates a first action to be performed at the first remotely controllable object, using the volume control element, wherein the first action comprises at least one of changing a volume and selecting a volume at the first remotely controllable object;
(e) at the first mobile device, in response to receiving the first input that indicates the first action to be performed at the first remotely controllable object, wirelessly transmitting a third communication, to the remote server, the third communication comprising information based on the first input; and (f) at the first mobile device, after receiving the first input that indicates the first action to be performed at the first remotely controllable object, presenting first feedback relating to the first input at the first remote control user interface.

23. The system of claim 22, wherein the first remotely controllable object comprises at least one of a television, a cable set-top box, a media player, and an entertainment system.

24. The system of claim 22, wherein receiving the first communication comprises using an interactive display at the first mobile device to receive the first communication as an input from a first user.

25. The system of claim 22, wherein receiving the first communication comprises using a microphone associated with the first mobile device to receive the first communication as a voice command.

26. The system of claim 22, wherein receiving the first communication comprises using an optical reader at the first mobile device to receive the first communication as a visual identifier.

27. The system of claim 22, wherein receiving the first communication comprises using a receiver at the first mobile device to receive the first communication as a wireless communication.

28. The system of claim 22, wherein receiving the first input comprises using an interactive display at the first mobile device to receive the first input as an input from a first user.

29. The system of claim 22, wherein receiving the first input comprises using a microphone associated with the first mobile device to receive the first input as a voice command from a first user.

30. The system of claim 22, wherein receiving the first input comprises using the first mobile device to receive the first input as a user manipulation by a first user.

31. The system of claim 22, wherein the method further comprises:
(g) at the first remotely controllable object, performing the first action.

32. The system of claim 22, wherein the method further comprises:
(g) at the first mobile device, at a fifth time after the first time, presenting the first remote control user interface, wherein the first remote control user interface comprises a channel control element to control a channel at the first remotely controllable object.

33. The system of claim 32, wherein the method further comprises:
(h) at the first mobile device, at a sixth time after the fifth time, receiving a second input that indicates a second action to be performed at the first remotely controllable object, using the channel control element, wherein the second action comprises controlling the channel at the first remotely controllable object;
(i) at the first mobile device, in response to receiving the second input that indicates the second action to be performed at the first remotely controllable object, wirelessly transmitting a fourth communication, to the remote server, the fourth communication comprising information based on the second input; and
(j) at the first mobile device, after receiving the second input that indicates the second action to be performed at the first remotely controllable object, presenting second feedback relating to the second input at the first remote control user interface.

34. The system of claim 33, wherein the method further comprises:
(k) at the first remotely controllable object, performing the second action.

35. The system of claim 22, wherein the method further comprises:
(g) at the remote server, receiving the third communication, the third communication comprising information based on the first action.

36. The system of claim 35, wherein the method further comprises:
(h) at the remote server, transmitting a fourth communication to the first remotely controllable object, the fourth communication comprising information derived from the third communication.

37. The system of claim 36, wherein the method further comprises:
(i) at the first remotely controllable object, receiving the fourth communication; and
(j) at the first remotely controllable object, in response to receiving the fourth communication, performing the first action.

38. The system of claim 35, wherein the method further comprises:
(h) at the remote server, transmitting a fourth communication to the first mobile device, the fourth communication comprising information derived from the third communication.

39. The system of claim 38, wherein the method further comprises:
(i) at the first mobile device, receiving the fourth communication; and
(j) at the first mobile device, at the first remote control user interface, presenting information derived from the fourth communication.

40. The system of claim 22, wherein the method further comprises:
(g) at the first remotely controllable object, displaying a visual identifier that represents the identity of the first remotely controllable object.

41. The system of claim 22, wherein the method further comprises:
(g) at the first remotely controllable object, transmitting a signal that represents the identity of the first remotely controllable object.

42. The system of claim 22, wherein the information representing the identity of the first remotely controllable object further comprises a code.

43. A method performed by at least one computer processor executing computer program instructions stored on at least one non-transitory computer-readable medium to perform a method, the method comprising:
(a) at a first remotely controllable object, displaying a first visual identifier that represents a first identity of the first remotely controllable object;
(b) at a first mobile device, at a first time, using an interactive display to receive a first communication, as a first input from a first user, wherein the first input comprises information representing the first visual identifier, wherein the first remotely controllable object and the first mobile device are physically distinct from each other;
(c) at the first mobile device, in response to receiving the first communication, wirelessly transmitting a second communication, to a remote server, wherein the second communication comprises the information representing the identity of the first remotely controllable object, and wherein the first remotely controllable object and the remote server are physically distinct from one another;

(d) at the first mobile device, at a second time after the first time, presenting a first remote control user interface, wherein the first remote control user interface comprises a channel control element to control a channel at the first remotely controllable object;

(e) at the first mobile device, at a third time after the second time, receiving a second input that indicates a first action to be performed at the first remotely controllable object, using the channel control element, wherein the first action comprises at least one of increasing a channel and decreasing a channel at the first remotely controllable object;

(f) at the first mobile device, in response to receiving the second input that indicates the first action to be performed at the first remotely controllable object, wirelessly transmitting a third communication, to the remote server, the third communication comprising information based on the second input; and (g) at the first mobile device, after receiving the second input that indicates the first action to be performed at the first remotely controllable object, presenting first feedback relating to the second input at the first remote control user interface.

44. The method of claim 43, further comprising:

(h) at the first remotely controllable object, displaying a second visual identifier that represents a second identity of the first remotely controllable object, wherein the second visual identifier is distinct from the first visual identifier; and (i) at the first mobile device, at a fourth time after the third time, using an interactive display to receive a second communication, as a second input from the first user, wherein the second input comprises information representing the second visual identifier.

45. A system comprising at least one non-transitory computer-readable medium having computer program instructions stored thereon, the computer program instructions being executable by at least one computer processor to perform a method, the method comprising:

(a) at a first remotely controllable object, displaying a first visual identifier that represents a first identity of the first remotely controllable object;

(b) at a first mobile device, at a first time, using an interactive display to receive a first communication, as a first input from a first user, wherein the first input comprises information representing the first visual identifier, wherein the first remotely controllable object and the first mobile device are physically distinct from each other;

(c) at the first mobile device, in response to receiving the first communication, wirelessly transmitting a second communication, to a remote server, wherein the second communication comprises the information representing the identity of the first remotely controllable object, and wherein the first remotely controllable object and the remote server are physically distinct from one another;

(d) at the first mobile device, at a second time after the first time, presenting a first remote control user interface, wherein the first remote control user interface comprises a channel control element to control a channel at the first remotely controllable object;

(e) at the first mobile device, at a third time after the second time, receiving a second input that indicates a first action to be performed at the first remotely controllable object, using the channel control element, wherein the first action comprises at least one of increasing a channel and decreasing a channel at the first remotely controllable object;

(f) at the first mobile device, in response to receiving the second input that indicates the first action to be performed at the first remotely controllable object, wirelessly transmitting a third communication, to the remote server, the third communication comprising information based on the second input; and (g) at the first mobile device, after receiving the second input that indicates the first action to be performed at the first remotely controllable object, presenting first feedback relating to the second input at the first remote control user interface.

46. The system of claim 45, wherein the method further comprises:

(h) at the first remotely controllable object, displaying a second visual identifier that represents a second identity of the first remotely controllable object, wherein the second visual identifier is distinct from the first visual identifier; and (i) at the first mobile device, at a fourth time after the third time, using an interactive display to receive a second communication, as a second input from the first user, wherein the second input comprises information representing the second visual identifier.

\* \* \* \* \*